(12) United States Patent
Butkovic et al.

(10) Patent No.: US 11,392,757 B2
(45) Date of Patent: Jul. 19, 2022

(54) MANAGEMENT OF ANNOTATION JOBS

(71) Applicant: Figure Eight Technologies, Inc., San Francisco, CA (US)

(72) Inventors: Andrea Butkovic, Berkeley, CA (US); Matthew Allen Gordon, Miami, FL (US); Joseph Richard Cloughley, San Francisco, CA (US); Kiran Vajapey, San Francisco, CA (US); Caiqun Xiao, San Francisco, CA (US)

(73) Assignee: Figure Eight Technologies, Inc., San Francisco, CA (US)

( * ) Notice: Subject to any disclaimer, the term of this patent is extended or adjusted under 35 U.S.C. 154(b) by 0 days.

(21) Appl. No.: 16/857,014

(22) Filed: Apr. 23, 2020

(65) Prior Publication Data

US 2020/0342165 A1   Oct. 29, 2020

Related U.S. Application Data

(60) Provisional application No. 62/839,510, filed on Apr. 26, 2019.

(51) Int. Cl.
| | |
|---|---|
| *G06F 17/00* | (2019.01) |
| *G06F 40/169* | (2020.01) |
| *G06F 40/284* | (2020.01) |
| *G06N 5/02* | (2006.01) |
| *G06F 16/33* | (2019.01) |

(52) U.S. Cl.
CPC ........ *G06F 40/169* (2020.01); *G06F 16/3344* (2019.01); *G06F 40/284* (2020.01); *G06N 5/02* (2013.01)

(58) Field of Classification Search
CPC .. G06F 40/169; G06F 16/3344; G06F 40/284; G06N 5/02
See application file for complete search history.

(56) References Cited

U.S. PATENT DOCUMENTS

| | | | |
|---|---|---|---|
| 8,275,803 B2 | 9/2012 | Brown | |
| 8,423,952 B2* | 4/2013 | Bogl | G06Q 10/06 717/105 |
| 8,650,022 B2* | 2/2014 | Boegl | G06F 40/30 704/10 |
| 9,703,549 B2* | 7/2017 | Dufresne | G06F 8/60 |
| 9,766,879 B2* | 9/2017 | Dufresne | G06N 5/00 |
| 10,127,214 B2* | 11/2018 | Munro | G06F 40/169 |
| 2004/0243645 A1 | 12/2004 | Broder | |
| 2006/0216685 A1* | 9/2006 | Brodie | G09B 7/02 434/323 |
| 2010/0293451 A1* | 11/2010 | Carus | G06N 20/00 715/256 |

(Continued)

*Primary Examiner* — Mohammed H Zuberi
(74) *Attorney, Agent, or Firm* — Van Pelt, Yi & James LLP

(57) ABSTRACT

Managing annotation jobs is disclosed, including: receiving an annotation job, including: obtaining an input text to be annotated; and obtaining an ontology specifying a plurality of labels to be used to annotate the input text; distributing the annotation job to a plurality of annotator devices via an annotation platform; receiving a plurality of annotation results with respect to the input text from the plurality of annotator devices; and providing an aggregate annotation report corresponding to the annotation job, wherein the aggregate annotation report combines the plurality of annotation results.

20 Claims, 27 Drawing Sheets

(56) References Cited

U.S. PATENT DOCUMENTS

| | | | |
|---|---|---|---|
| 2014/0040727 A1* | 2/2014 | Bao | G06Q 30/00 |
| | | | 715/234 |
| 2015/0356057 A1* | 12/2015 | Subramanian | G16H 10/60 |
| | | | 704/9 |
| 2015/0356260 A1* | 12/2015 | D'Souza | G06F 40/12 |
| | | | 705/2 |
| 2016/0019299 A1 | 1/2016 | Boloor | |
| 2016/0026622 A1 | 1/2016 | Bunin | |
| 2016/0034454 A1* | 2/2016 | Musil | G06F 16/435 |
| | | | 707/733 |
| 2016/0034512 A1 | 2/2016 | Singhal | |
| 2016/0162464 A1 | 6/2016 | Munro | |
| 2016/0162837 A1* | 6/2016 | Muntes | G06Q 10/103 |
| | | | 705/301 |
| 2016/0352860 A1* | 12/2016 | Deb | H04L 67/306 |
| 2018/0108344 A1* | 4/2018 | Lacoss-Arnold | G10L 13/047 |
| 2018/0246867 A1 | 8/2018 | Chiticariu | |
| 2019/0065453 A1 | 2/2019 | Bulgakov | |
| 2019/0079923 A1* | 3/2019 | Hagiwara | G06F 40/30 |

* cited by examiner

FIG. 10B

| ∨ Jobs | DATA | DESIGN ⟩ | QUALITY | LAUNCH | MONITOR | RESULTS | |
|---|---|---|---|---|---|---|---|

Data

[ Split column ] [ Download ] [ Add more data ]

Next: Design your job

JOB ID 998461

Annotate text snippets from different kinds of messages username@crowdflower.com ⚙ Settings
◉ Preview
⎘ Copy ▶

READ THE DOCS
Design Tips
Graphical Editor Guide
Instructions and tips

| ☐ | UNIT ID ▼ | STATE | JUDGEMENTS | AGREEMENT | FULL_TEXT |
|---|---|---|---|---|---|
| ☐ | 1180221325 | new | 0 | | thanks for the reply do you stock any upright freezers that |
| ☐ | 1180221325 | new | 0 | | ok could you please hold for a min while i look for it ? |
| ☐ | 1180221325 | new | 0 | | Is there a down rod available in Natural Iron ? |
| ☐ | 1180221325 | new | 0 | | Where is the best place in the house for this appliance? |
| ☐ | 1180221325 | new | 0 | | Will the Model HAF-CINS that you sell at Home Depot wo |
| ☐ | 1180221325 | new | 0 | | custom hardwood door |
| ☐ | 1180221325 | new | 0 | | Is the fancy plug really worth the difference in price ? |
| ☐ | 1180221325 | new | 0 | | I'm trying to find a battery for and black and decker weed |
| ☐ | 1180221325 | new | 0 | | Any recommendations for a top loading HE washer and ele |

< Jobs | username ▶

Design > Manage Image Annotation Ontology

DATA | DESIGN > | QUALITY | LAUNCH | MONITOR | RESULTS

[Upload] [Download] [Add Class] [Save]

| TITLE | DESCRIPTION | OUTPUT VALUE |
|---|---|---|
| ☐ Brand | Companies, agencies, institutions. Examples include Nike | 1 |
| ▨ Product Type | Objects, vehicles, foods, etc. | 2 |
| ▨ SKU/Model Number | | 3 |
| ☰ Attribute | | 255 ✎ 🗑 |

JOB ID 998461
Annotate text snippets from different kinds of messages
username@crowdflower.com ✱ Settings
◉ Preview
▢ Copy ▶

READ THE DOCS
Design Tips
Graphical Editor Guide
Instructions and tips

```
id:            2602712495
▼ tokens:
   ▼ 0:
      text:       "it"
      startIdx:   0
      endIdx:     2
   ▼ 1:
      text:       " 's"
      startIdx:   2
      endIdx:     4
   ▼ 2:
      text:       "eight"
      startIdx:   5
      endIdx:     10
   ▼ 3:
      text:       "one"
      startIdx:   11
      endIdx:     14
   ▼ 4:
      text:       "side"
      startIdx:   15
      endIdx:     19
   ▼ 5:
      text:       "sentence"
      startIdx:   20
      endIdx:     28
   ▼ 6:
      text:       "street"
      startIdx:   29
      endIdx:     35
```

FIG. 17

2700 ⬇ ▼Spans:
   ▼ 0:
     ▼ tokens:
       ▼ 0:
         text:         "it"
         startIdx:    0
         endIdx:     2
       classname:    ""
       confidence:   1
       annotated_by: "machine"
   ▼ 1:
     ▼ tokens:
       ▼ 0:
         text:         " 's"
         startIdx:    2
         endIdx:     4
       classname:    ""
       confidence:   1
       annotated_by: "machine"
   ▼ 2:
     ▼ tokens:
       ▼ 0:
         text:         "eight"
         startIdx:    5
         endIdx:     10
       ▼ 1:
         text:         "one"
         startIdx:    11
         endIdx:     14
       classname:    "ADDRESS - STREET NUMBER"
       confidence:   0.6088
       annotated_by: "human"
   ▼ 3:
     ▼ tokens:
       ▼ 0:
         text:         "side"
         startIdx:    15
         endIdx:     19
       ▼ 1:
         text:         "sentence"
         startIdx:    20
         endIdx:     28
       ▼ 2:
         text:         "street"
         startIdx:    29
         endIdx:     35
       classname:    "ADDRESS - STREET NAME"
       confidence:   0.6088
       annotated_by: "human"

FIG. 18

MANAGEMENT OF ANNOTATION JOBS

CROSS REFERENCE TO OTHER APPLICATIONS

This application claims priority to U.S. Provisional Patent Application No. 62/839,510 entitled MACHINE LEARNING ASSISTED TEXT ANNOTATION filed Apr. 26, 2019 which is incorporated herein by reference for all purposes.

BACKGROUND OF THE INVENTION

Conventionally, humans manually label text-based training data to indicate which class(es) the training data falls under. The training data can be used to create and/or update machine learning models that can automatically classify input data. However, the semantics of language changes often and new lingo is introduced frequently, which makes the manual labeling of text laborious and also inefficient.

BRIEF DESCRIPTION OF THE DRAWINGS

Various embodiments of the invention are disclosed in the following detailed description and the accompanying drawings.

FIG. 10B is a diagram showing a second example user interface to be presented at an annotation job management device for receiving an annotation job.

FIG. 10C is a diagram showing a user interface to be presented at an annotation job management device for presenting queries associated with an annotation job.

FIG. 11B is a diagram showing an example user interface to be presented at an annotation job management device for presenting a customized list of classes (labels) of an ontology associated with an annotation job.

FIG. 11C is a diagram showing another example user interface to be presented at an annotation job management device for presenting a customized list of classes (labels) of an ontology associated with an annotation job.

FIG. 13 is a diagram showing an example user interface to be presented at an annotation job management device for reviewing the annotation answer that was provided by an annotator user to a test question associated with an annotation job.

FIG. 16 is a diagram showing an example user interface to be presented at an annotator device to describe how an annotator answer performed on a test question associated with an annotation job.

FIG. 17 is a diagram showing the JSON file that includes at least some information pertaining to a query that is part of input text of an annotation job.

FIG. 18 is a diagram showing the JSON file that includes at least some information pertaining to an aggregate annotation report that had been generated for an annotation job.

DETAILED DESCRIPTION

Figure 1:
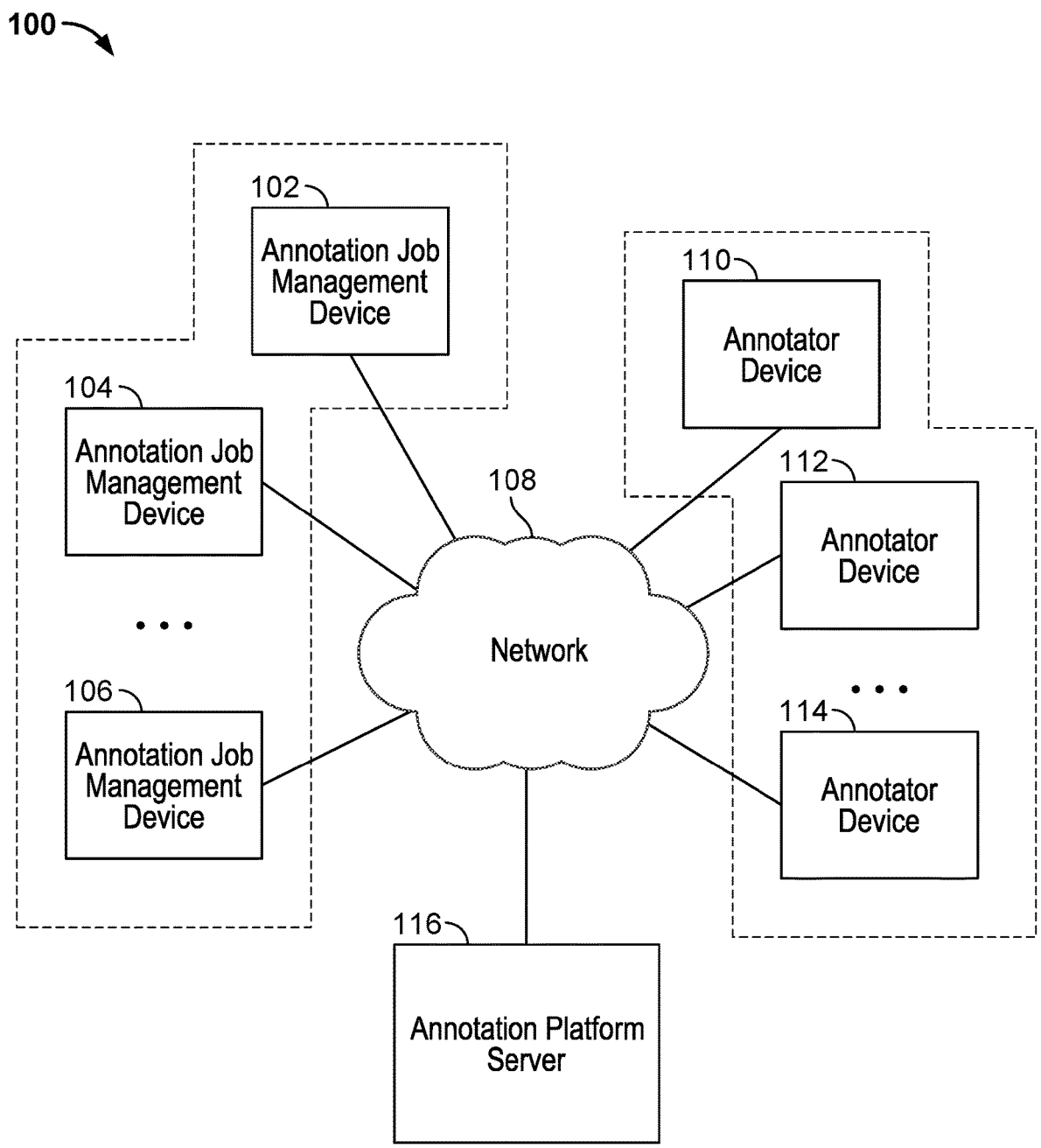
FIG. 1 is a diagram showing an embodiment of a system for managing annotation jobs.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of managing annotation jobs are described herein. An annotation job is received (e.g., via a user interface). For example, an annotation job is created by a data scientist or a data engineer at an enterprise that is looking to efficiently annotate a body of text so that the annotated text can be used to build a new or update an existing machine learning model for automatically annotating subsequent text input. An input text that is to be annotated for the annotation job is obtained. The input text comprises the text that is to be annotated. In some embodiments, the input text is not annotated. In some embodiments, the input text includes annotations (that were generated by users and/or by machine learning models). In some embodiments, the input text may include discrete units of text that are sometimes referred to as "queries." For example, each query in the input text may be a sentence or a paragraph. An ontology specifying a plurality of labels to be used to annotate the input text associated with the annotation job is received. In various embodiments, an "ontology" comprises a set (e.g., a hierarchy) of labels (e.g., classes) from which annotator users can select to annotate portions of the input text. The annotation job is distributed to a plurality of annotator devices via an annotation platform. In various embodiments, distributing the annotation job to annotator devices comprises sending at least portions of the input text to the devices that are used by annotator users, who are users that will annotate the received portions of the input text at a user interface using the ontology that is provided for the annotation job. The annotation results with respect to the input text are received from the plurality of annotator devices. In various embodiments, "annotation results" comprise annotations (selected labels from the ontology) with respect to the input text. An aggregate annotation report corresponding to the annotation job is provided. In various embodiments, the aggregate annotation report combines the annotation results. In some embodiments, in generating the aggregate annotation report, the one or more annotation results that were submitted by annotator devices with respect to each query of the input text are analyzed to determine a respective aggregated label (from the ontology associated with the annotation job) corresponding to at least some portions of the query. In some embodiments, the aggregate annotation report may be presented at a user interface as a graphical representation (e.g., a chart or a graph). In some embodiments, the aggregate annotation report is configured to be used as training data for a new or existing machine learning model that is configured to automatically annotate the input data based at least in part on the labels provided in the ontology associated with the annotation job.

FIG. 1 is a diagram showing an embodiment of a system for managing annotation jobs. In the example of FIG. 1, system 100 includes a set of annotation job management devices (including annotation job management devices 102, 104, and 106), a set of annotator devices (including annotator devices 110, 112, and 114), network 108, and annotation platform server 116. Each of annotation job management devices 102, 104, and 106 communicates with annotation platform server 116 over network 108. Each of annotator devices 110, 112, and 114 communicates with annotation platform server 116 over network 108. Network 108 includes data and/or telecommunications networks. System 100 merely shows example numbers of annotation job management devices and annotator devices. In actual practice, more or fewer annotation job management devices and annotator devices may be communicating with annotation platform server 116

An annotation job management device (such as any of annotation job management devices 102, 104, and 106) may be a desktop computer, a tablet device, a smart phone, or any networked device. An annotation job management device may be operated by a user, for example, that is responsible for obtaining annotated training data (e.g., to aid in the creation of a new machine learning model or the updating of an existing machine learning model that is configured to automatically annotate input data). For example, an annotation job management device may be operated by a user with a data scientist or a data engineer role at an enterprise. To start a new annotation job, the annotation job management device is configured to send a request to create a new annotation job to annotation platform server 116. To create the new annotation job, the annotation job management device is configured to send input text associated with the annotation job to annotation platform server 116. In some embodiments, the input text comprises a set of discrete text units (which are sometimes called "queries"). For example, each query includes a partial sentence or one or more sentences. In some embodiments, the input text is already tokenized. In some embodiments, the input text is not yet tokenized. In various embodiments, the input text being tokenized refers to the input text being partitioned into semantically meaningful units. For example, a "token" may refer to a single word or multiple words (such as a phrase). Tokenization may vary depending on the language of the input text. For example, if the annotator job creator user of the annotation job management device is a data scientist/ engineer at an enterprise, the input text may be collected from the enterprise's customers. For example, search queries, emails, transcribed voice messages, and/or reviews that are submitted by an enterprise's customers may form the input text of an annotation job. In some embodiments, at least a portion of the input text is already annotated by previous annotators or an existing machine learning model. In addition to the input text, the annotation job management device is further configured to send an ontology associated with the annotation job to annotation platform server 116. As mentioned above, an ontology comprises a set (e.g., hierarchy) of labels (which are sometimes referred to as "classes") that are to be used by the users (which are sometimes referred to as "annotator users" or "contributor users" or simply as "annotators" or "contributors") of annotator devices (such as annotator devices 110, 112, and 114) to annotate the tokens of the input text. In some embodiments, the ontology that is submitted with an annotation job also includes descriptions/instructions of how to perform annotation of text using the labels of the ontology. In some embodiments, the annotation job management device is configured to send selections of annotator users to whom the input text is to be distributed for the annotator users to annotate. For example, the selections of annotator users may include criteria associated with attributes of annotator users that are desired by the annotation job creator job. In some embodiments, the annotation job management device is further configured to send a set of test questions and their corresponding test answers associated with the annotation job to annotation platform server 116. As will be described in further detail below, the test questions associated with an annotation job will be used to evaluate the quality of the annotator users' submitted annotation results and programmatically identify certain annotator users whose annotation accuracy level falls below a predetermined accuracy level such that their submitted annotation results will be excluded from the aggregate annotation report to be generated for the annotation job.

In response to receiving data associated with a new annotation job from an annotation job management device (such as any of annotation job management devices 102, 104, and 106), annotation platform server 116 is configured to store information with the annotation job. Annotation platform server 116 is configured to distribute queries from the annotation job's input text to the annotator devices associated with annotator users that have been selected (e.g., meet the selection criteria provided) by the annotation job creator user. In some embodiments, for each annotator device (such as annotator device 110, 112, and 114) associated with a selected annotator user, annotation platform server 116 is configured to send a set of queries from the input text of the annotation job as well as at least one test question of the annotation job. In some embodiments, annotation platform server 116 is configured to send the same query to more than one annotator device. In some embodiments, the set of queries and the test question(s) will be presented at the same user interface at the annotator device. In some embodiments, the presentation of a query and the presentation of a test question at the user interface will be the same or similar such that the annotator user will not be able to discern the test question from the queries. As will be described in further detail below, in some embodiments, the user interface that is presented at an annotator device with quer(ies) and test question(s) also presents the ontology associated with the annotation job so that the annotator user will know which labels (included in the ontology) are available for annotating the text in each query or test question. Using the user interface that presents the quer(ies) and test question(s), the annotator user is guided to select one or more tokens in a query or test question and associate with the selection with one or more presented labels from the ontology. The annotator device is configured to send the annotator user selected annotations (labels) associated with queries of the input text back to annotation platform server 116 as "annotation results" and to send the annotator user selected annotations (labels) associated with test questions as "annotator answers." For example, the annotator user is to perform annotation of queries and test questions that encompasses "named entity recognition," "entity extraction," and "parts of speech labeling." The annotations may be used for understanding search intent, categorizing documents, and scrubbing through large format files, for example.

Annotation platform server 116 is configured to compare the annotator answer corresponding to each test question to the stored correct test answer (that was provided by the annotation job creator user) to determine whether the annotator answer meets or exceeds a pass threshold (also configured by the annotation job creator user). In the event that the annotator answer meets or exceeds a pass threshold, annotation platform server 116 is configured to update (e.g., increase) an accuracy level associated with the annotator user that had submitted the annotator answer. In the event that the annotator answer does not meet a pass threshold, annotation platform server 116 is configured to update (e.g., decrease) the accuracy level associated with the annotator user that had submitted the annotator answer. In some embodiments, in the event that the annotator answer does not meet a pass threshold, annotation platform server 116 is configured to generate a user interface that describes which submitted annotations that the annotator user got right (relative to the annotation job creator job's correct test answer) and which submitted annotations that the annotator user got wrong so that the annotator user can be programmatically informed of how text annotation is to be performed using the particular ontology that is provided with the particular annotation job. Annotation platform server 116 is configured to compare an annotator user's corresponding accuracy level to a predetermined threshold and if the accuracy level meets or exceeds the predetermined threshold, annotation platform server 116 is configured to continue to send additional queries and test questions to the annotator user's annotator device. Otherwise, if the accuracy level falls below the predetermined accuracy level threshold, annotation platform server 116 is configured to no longer send additional queries and test questions to the annotator user's annotator device and instead, mark (or otherwise cause) the annotation results submitted by that annotator user for queries of the input text of the annotation job to be excluded from the aggregate annotation report to be generated for the annotation job.

Annotation platform server 116 is configured to aggregate the annotation results corresponding to each query of the input text that is received from at least a predetermined number of annotator devices to obtain aggregated labels for each of one or more tokens that are included in the query. In some embodiments, annotation results that are excluded from being included in the aggregate annotation report include, for example, the annotation results submitted from annotation users whose corresponding accuracy levels failed to meet the predetermined accuracy level threshold based on their response to test questions, as described above, and also, for example, annotation results that are excluded based on automated or manual quality control. For example, if the distribution of an annotator user's answers is substantially different from other annotator users' answers in the job or if the annotation job creator user notices they are doing poor work, then that annotator user's annotation results may be excluded from the aggregate annotation report generated for the annotation job. For example, for a given token in a query, annotation platform server 116 is configured to determine an aggregated label corresponding to that token based on the one or more annotator user submitted annotation results (labels) for that token and then generate a corresponding confidence level. Aggregating multiple annotation results corresponding to a single token or set of adjacent tokens (which is sometimes referred to as a "span") can improve the accuracy of the annotation over a single annotator user's annotation result of that token/set of tokens. In various embodiments, annotation platform server 116 is configured to generate an aggregate annotation report that includes, for each query of the input data of the annotation job, at least the aggregated label corresponding to each token for which annotation results were collected and also a corresponding confidence level. Annotation platform server 116 is configured to send the aggregate annotation report corresponding to the annotation job back to the annotation job management device from which the annotation job was received. In some embodiments, the aggregate annotation report comprises a graphical representation. In some embodiments, the aggregate annotation report comprises a JSON file. In some embodiments, the annotation job management device that receives the aggregate annotation report is configured to input at least a portion of the report as training data into a new or existing machine learning model to train the model to better automatically label subsequent input text based on the labels of the ontology associated with the annotation job.

As described with system 100 of FIG. 1 and in further detail below, an annotation job with input text to be annotated can be easily created by an annotator job creator user and the corresponding input text can be efficiently distributed to a vast number of annotator devices. Annotation results corresponding to the input text can be efficiently obtained from the annotator devices and test questions that are associated with the annotation job can be provided to the annotator users to ensure that the quality and accuracy of the annotator users' annotation results are programmatically maintained without requiring manual review of each annotator user's annotation results. Given that numerous annotator users can perform annotations on the same input text of an annotation job in parallel, the annotation results and subsequent aggregate annotation report can be quickly generated for a particular annotation job in a manner that is not possible with conventional manual techniques of annotating data and the manual review thereof.

Figure 2:
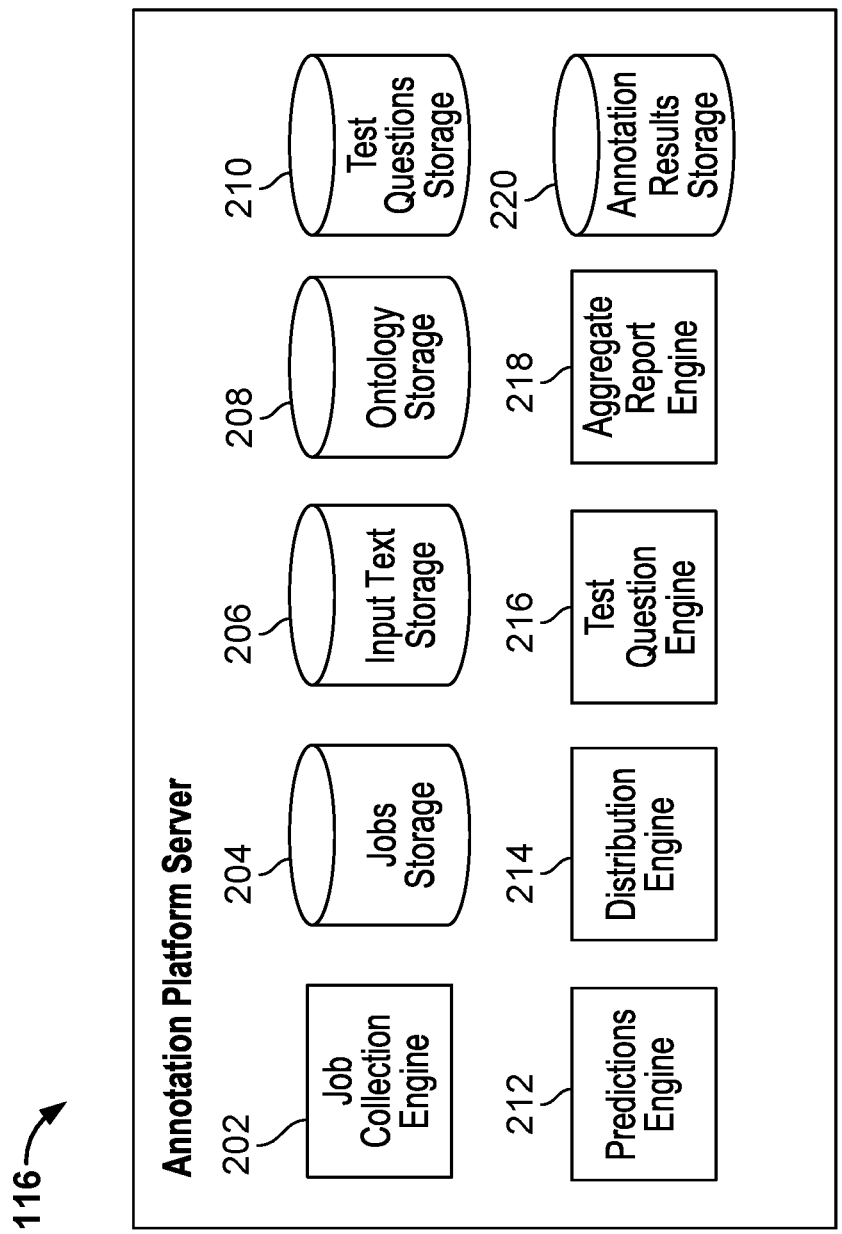
FIG. 2 is a diagram showing an example of an annotation platform server.

FIG. 2 is a diagram showing an example of an annotation platform server. In some embodiments, annotation platform server 116 of FIG. 1 may be implemented using the example annotation platform server of FIG. 2. In FIG. 2, the example of the annotation platform server includes job collection engine 202, jobs storage 204, input text storage 206, ontology storage 208, test questions storage 210, predictions engine 212, distribution engine 214, test question engine 216, aggregate report engine 218, and annotation results storage 220. Each of job collection engine 202, predictions engine 212, distribution engine 214, test question engine 216, and aggregate report engine 218 may be implemented using one or both hardware and software. Each of jobs storage 204, input text storage 206, ontology storage 208, test questions storage 210, and annotation results storage 220 may be implemented using one or more databases and/or other types of storage media.

Job collection engine 202 is configured to collect information pertaining to annotation jobs. In some embodiments, job collection engine 202 is configured to provide a user interface to an annotation job creator user at that user's corresponding annotation job management device. The user interface would enable the annotation job creator user to submit information pertaining to a new or an existing annotation job to job collection engine 202. Examples of information pertaining to a new or an existing annotation job may include at least a set of input text, an ontology, and a set of test questions. In some embodiments, the input text comprises a set of queries, where each query comprises a sentence and/or contextual information (e.g., a paragraph in which the sentence was originally included). In some embodiments, if the input text is not already tokenized (e.g., partitioned into tokens), job collection engine 202 is configured to perform tokenization on the input text and/or query a third party server to do so. The input text may include annotations or no annotations. In the event that the input text does not include annotations, job collection engine 202 may be requested by the annotation job management device to cause predictions engine 212 to query a third party server to input the unannotated input text into a third party machine learning model (e.g., spaCy) to add machine predicted annotations (which are sometimes referred to as "machine predictions") to the input text using an ontology associated with that third party machine learning model. Predictions engine 212 is configured to query a third party server to input the unannotated input text into a third party machine learning model that is selected by the annotation job creator user using the annotation job management device. In some embodiments, job collection engine 202 is configured to receive selections of particular annotator users and/or criteria associated with desired annotator users to whom the input text is to be distributed for the purposes of performing annotation. After receiving information pertaining to an annotation job from an annotation job management device, job collection engine 202 is configured to store (e.g., unique) identifying information associated with the annotation job at jobs storage 204. Furthermore, job collection engine 202 is configured to store the input text associated with the annotation job at input text storage 206, the ontology associated with the annotation job at ontology storage 208, and the test questions associated with the annotation job attest questions storage 210. In some embodiments, job collection engine 202 is further configured to keep track of the current status of the annotation job such as, for example, which queries of the input text have been annotated by one or more annotator users and how each test question has been answered by one or more annotator users. In some embodiments, job collection engine 202 is configured to present a user interface at the annotation job management device describing the current status of the annotation job.

Input text storage 206 stores the input text associated with one or more annotation jobs for which data is stored at jobs storage 204. In some embodiments, the input text stored at input text storage 206 may be tokenized or not yet tokenized. In some embodiments, the input text associated with annotation jobs for which information is stored at jobs storage 204 is not stored at input text storage 206 but is rather stored at a third party repository that is accessible by the annotation platform server. For example, input text stored at input text storage 206 is stored as a CSV or another format that can delimit between different queries of the input text.

Ontology storage 208 is configured to store the ontologies associated with one or more annotation jobs for which data is stored at jobs storage 204. In some embodiments, at least some labels within an ontology associated with an annotation job include instructions for when and/or how to annotate a token or a span with a corresponding label. In some embodiments, in addition to storing ontologies submitted by the annotation job management device, ontology storage 208 is configured to store ontologies associated with third party machine learning models.

Test questions storage 210 is configured to store test questions and correct test answers associated with one or more annotation jobs for which data is stored at jobs storage 204. In some embodiments, each test question is stored in a JSON format. In some embodiments, a test question comprises a series of tokens. In some embodiments, a correct test answer corresponding to a test question includes one or more correct label annotations corresponding to at least some of the tokens and/or spans (two or more merged tokens) of the test question. In some embodiments, rules associated with a passing threshold associated with each test question and the corresponding correct test answer are stored at test questions storage 210. For example, the rules associated with a passing threshold associated with each test question and corresponding correct test answer describe how much discrepancies can exist between it and an annotator user provided answer and still have that annotator user provided answer be deemed correct/passing.

Distribution engine 214 is configured to distribute the queries and test questions associated with an annotation job for which data is stored at jobs storage 204 to one or more annotator devices. In some embodiments, the annotator users will receive queries and test questions from distribution engine 214 at their respective annotator devices that are selected using the selections and/or criteria associated with the annotation job from a storage such as jobs storage 204. For each selected annotator user, distribution engine 214 is configured to provide a user interface at the selected annotator user's corresponding annotator device at which the annotator user can perform annotation of text. As will be described in further detail below, the user interface that is provided by the annotation platform server at an annotator device presents (e.g., at a single user interface) one or more queries from the annotation job's input text and one or more test questions from the annotation job. In various embodiments, distribution engine 214 is configured to present each query and each test question at the user interface to be presented at the annotator device in a similar manner so that the annotator user cannot distinguish between queries and test questions as they annotate them. Additionally, the user interface that is configured to present the queries and test questions is configured to simultaneously present the ontology associated with the annotation job so that the annotator user can be informed of the labels (of the ontology) that are available to use for performing annotation. As mentioned above, at least some ontologies associated with annotation jobs are configured to include descriptions/instructions on how and when to annotate with the labels of the corresponding ontology for a particular annotation job. In some embodiments, distribution engine 214 is configured to select queries and also test questions for an annotator user for a particular annotation job that the user has not previously received. The user interface that is configured to present queries and test questions at the annotator device comprises widgets and other interactive elements that the annotator user can use to select a single token or a span of multiple tokens and then associate one or more labels of that annotation job's ontology with the selected token or span. Once the annotator user has completed the annotations for a particular query, set of queries, and/or set of quer(ies) and test question(s), the annotation user can submit the annotation results to the queries of the input text and/or annotation answers to the test questions back to distribution engine 214. Distribution engine 214 is configured to send the received annotation results corresponding to the queries of the input text to aggregate report engine 218 and/or to annotation results storage 220. Distribution engine 214 is configured to send the received annotation answers to the test questions to test question engine 216.

Test question engine 216 is configured to compare a received annotation answer (from an annotator device) to a test question to the test question's corresponding correct test answer (e.g., that is stored at test questions storage 210). In some embodiments, test question engine 216 is configured to use stored rules associated with the test question to determine whether any discrepancies in the comparison of the annotation answer to the correct text answer may lead the annotation answer to be deemed failing or passing. Should the annotation answer be deemed to be failing, test question engine 216 is configured to generate and present a user interface at the annotator device that describes which annotations of tokens/spans in the annotation answer were correct and which annotations of tokens/spans in the annotation answer were incorrect relative to the correct test answer. In some embodiments, the user interface that describes which annotations of tokens/spans in the annotation answer were correct and which annotations of tokens/spans in the annotation answer were incorrect relative to the correct test answer needs to be acknowledged by the annotator user (e.g., through a selection of an element on the user interface) before test question engine 216 proceeds to request distribution engine 214 to resume sending from queries to that annotator device. In some embodiments, after the test question engine 216 determines whether the received annotation answer to a test question is correct or not, test question engine 216 is configured to increase the annotator user's corresponding accuracy level if the annotated answer had passed or decrease the annotator user's corresponding accuracy level if the annotated answer had not passed. Test question engine 216 is configured to compare an annotator user's accuracy level to a predetermined accuracy level threshold and if the annotator user's accuracy level falls below the predetermined accuracy level threshold, the annotator user is not considered reliable. As such, when the annotator user's accuracy level falls below the predetermined accuracy level threshold, test question engine 216 is configured to send a message to aggregate report engine 218 to cause the aggregate report engine 218 to exclude that annotator user's annotation results to the annotation job's input text queries from the aggregate annotation report to be generated for the annotation job. In some embodiments, if the annotator user's accuracy level falls below the predetermined accuracy level threshold, test question engine 216 is configured to further send a message to distribution engine 214 to cause distribution engine 214 to no longer send additional queries and/or test questions from the annotation job to the annotator device of that annotator user.

Aggregate report engine 218 is configured to generate an aggregate annotation report corresponding to an annotation job for which data is stored at jobs storage 204 based on annotation results that have been received from annotator devices for the input text associated with the annotation job. In some embodiments, aggregate report engine 218 is configured to collect all the annotation results that have been collected by distribution engine 214 and/or storage at annotation results storage 220 for each query of the input text associated with the annotation job. In some embodiments, annotation results that were submitted by an annotator user whose accuracy level fell below the predetermined accuracy level threshold are marked as such in annotation results storage 220 and therefore excluded, not used, discarded, or otherwise ignored by aggregate report engine 218 in generating the aggregate annotation report for the annotation job. In some embodiments, for each query in the input text associated with the annotation job, aggregate report engine 218 is configured to group together all the received annotation results with respect to each token and/or span (set of adjacent tokens) in the query. Then, for each token and/or span of the query, aggregate report engine 218 is configured to determine an aggregated label from the group of annotation results associated with that particular token or span as well as a corresponding confidence level. For example, the aggregated label corresponding to a token in a query is determined as the most frequently occurring annotation result (label) that had been submitted for the token and the corresponding confidence level is the percentage of time that that aggregated label has been submitted for the query by annotator devices among the total number of annotation results (labels) that had been submitted for that token. In some embodiments, if a token or span in a query had already been annotated by a machine learning model prediction in the input data, the existing machine prediction is compared with the aggregated label that is determined based on the annotator device submitted annotation results. In some embodiments, if a discrepancy exists between the existing machine prediction and the aggregated label corresponding to the token or span, then that discrepancy is also noted in the portion of the aggregate annotation report pertaining to that particular query. In some embodiments, each token or span of a query is identified in the aggregate annotation report by their respective positions (indices) in the query. As such, in various embodiments, the aggregate annotation report corresponding to the annotation job comprises, for each query of the input text associated with the annotation job, one or more of the following: all submitted (not excluded) annotation results corresponding to the query and the aggregated labels determined based on aggregated annotation results corresponding to each of at least some tokens or spans of the query. In some embodiments, annotation results storage 220 is configured to send the aggregate annotation report corresponding to the annotation job to the annotation job management device from which the annotation job was received. For example, the raw data of the aggregate annotation report is stored in a JSON format. In some embodiments, annotation results storage 220 is configured to generate a visual presentation based on the aggregate annotation report corresponding to the annotation job and then cause the visual presentation to be presented at the annotation job management device from which the annotation job was received. The annotation job creator user that had created the annotation job can then use the received aggregate annotation report as training data to build a new or update an existing machine learning model that is configured to label input data using at least the ontology that was provided with the annotation job.

The following is an example use case: Morgan, a data scientist at Corporation A, is responsible for keeping the search algorithm at CorporationA.com up to date and accurate. That means that as users search for new items (which change over time as different colors/textures/products become popular), the top results are relevant and help Corporation A sell more products online.

Periodically, Morgan takes a sample of the real user queries being submitted on CorporationA.com (such as "do you have any upright freezers that are 120/330 volts 50/60 cycle") and does analysis on the structure of the query to update the search model. To do this analysis and make updates to the model, Morgan uploads the text queries (input text) in a spreadsheet to an annotation job creation user interface that is provided by the annotation platform.

At the annotation job creation user interface that is provided by the annotation platform, Morgan creates a text annotation job, and sets up his job settings including recommended search query, how he wants the data tokenized and other settings, etc. He also specifies his ontology—in this case, he wants to extract new Brands, Product Types, any product SKU numbers and additional Attributes so the model can learn to recognize more of those data types. Morgan will create test questions, some very challenging and strict, others more lenient to ensure that annotator users are completing his annotations correctly. Then he launches his job.

Annotator users that have been determined to match the criteria submitted by Morgan see Morgan's annotation job as being available to them and work on it. They use the annotator user text annotation tool (e.g., user interface), complete with tooltips and hotkeys, to annotate data associated with the annotation job. The annotator users can refer to the detailed instructions provided by Morgan at all times in the tool, and can quickly search the Corporation A website (the search query provided by Morgan) to become familiar with the technical brands and products offered on their side. The annotator users annotate the input text associated with the annotation job, get feedback on their performance with test questions, and are offered an (e.g., financial) incentive for performing more annotations.

Once the job is complete, Morgan downloads the aggregate annotation report. For every query he collected, a predetermined number (e.g., five) of annotator users submitted annotation results on the query's text. His results link him to a JSON file that shows, for every query, the five separate annotation results and the high confidence aggregated label (which is sometimes referred to as "best answer") which was aggregated by combining the five annotation results (and sometimes weighted by the accuracy level of each annotation user that was determined by their performance on the test questions) into one aggregated label.

Morgan feeds this aggregate annotation report as new training data into his machine learning model, which performs better now that it has more up to date accurate data to learn from.

Next time Morgan needs to refresh the model, he will find more recent user queries. His model might be doing all right at this time, so he will have the model create predictions for what it sees in the text. He will format this data into a JSON format, and create a new annotation job on the annotation platform. As the annotator users work in this job, they will be annotating the text with the machine learning model predictions already made by Morgan's existing machine learning model and will be faster and more accurate. Morgan's new aggregate annotation report corresponding to the new annotation job will indicate when Morgan's model is accurate and when it required correction (e.g., because the machine prediction differed from the best answer/aggregated label that was determined by the annotation platform). This detailed feedback helps Morgan's model get better faster.

Some time later, Morgan is asked to work on the search algorithm for Corporation A's sister company, Corporation B. Corporation B's products also have brands, but they are very different than Corporation A's. Morgan wants to use machine assistance to help annotator users create the data but does not have an existing machine learning model that will do well predicting Corporation B's brand names.

In this text annotation job, Morgan will request the annotation platform server to apply a third party annotation model on Corporation B's input text to annotate the brands contained therein before, optionally, distributing the input text to annotator users. When annotator users or third party annotation models disagree on the annotation of a token or span in the input text, the annotation platform server is configured to resolve the conflict and show the most likely answer (which is sometimes referred to as the "aggregated label"). Each third party model or annotator user submitted annotation result may be imperfect, but the annotation platform server will use the collective results as an ensemble to help annotate the data better and faster. When Morgan downloads his results now, he will see which Brands were annotated by humans or models, and if so, which models predicted them.

Morgan now has an easy way to use to do the above flow for any kind of natural language model he needs to create.

Figure 3:
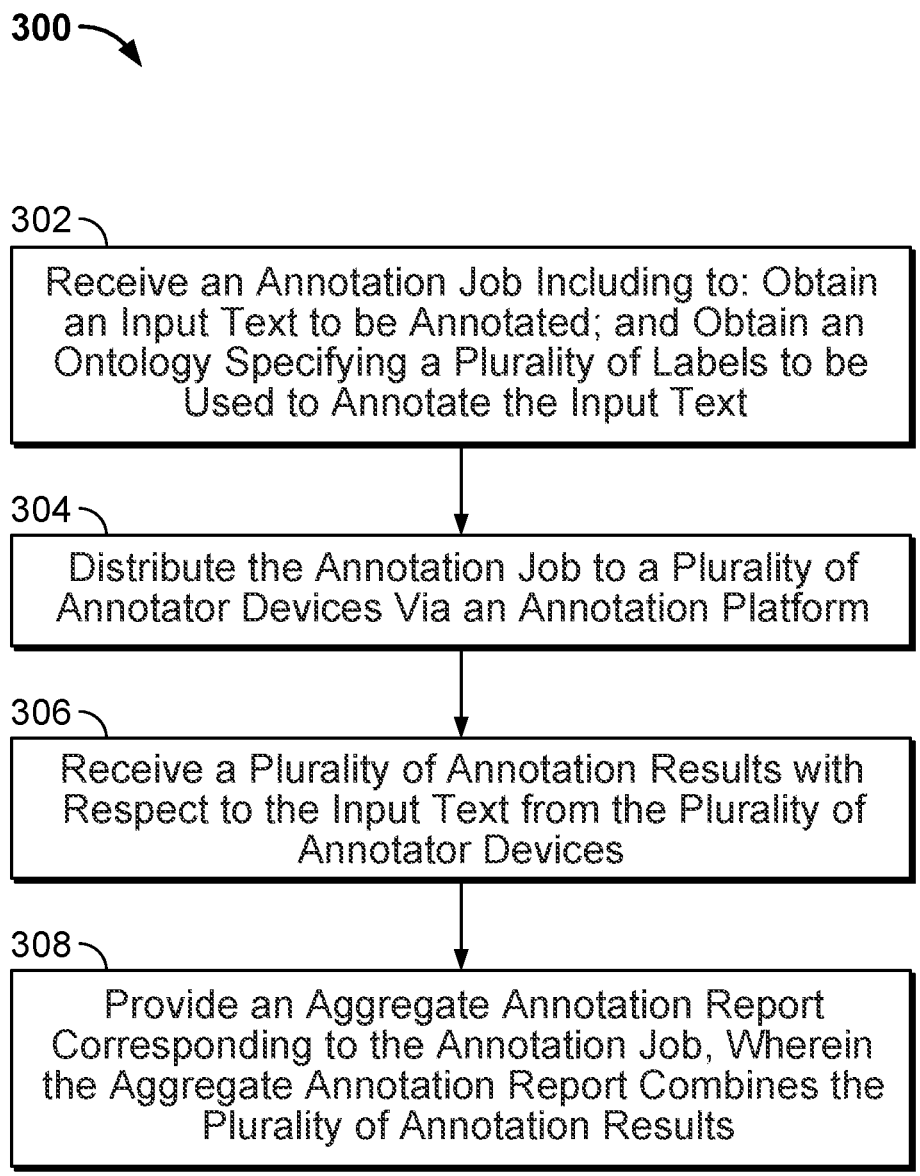
FIG. 3 is a flow diagram showing an embodiment of a process for managing annotation jobs.

FIG. 3 is a flow diagram showing an embodiment of a process for managing annotation jobs. In some embodiments, process 300 is implemented by an annotation platform server such as annotation platform server 116 of system 100 of FIG. 1.

At 302, an annotation job is received including: an input text to be annotated is to be obtained; and an ontology specifying a plurality of labels to be used to annotate the input text is to be obtained. In some embodiments, if the input text is not already tokenized, then the input text is tokenized (e.g., partitioned into tokens). For example, the annotation job creator user may select a type of tokenization to be performed on the input text. In some embodiments, the ontology is generated/customized by the annotation job creator user. In some embodiments, the ontology is selected from a third party service that provides ontologies (and corresponding third party machine learning models). In some embodiments, test questions and corresponding correct test answers are also received for the annotation job.

At 304, the annotation job is distributed to a plurality of annotator devices via an annotation platform. The queries of the input text (and test questions) of the annotation job are distributed to various annotator devices that are operated by annotator users that meet a set of criteria associated with the annotation job.

At 306, a plurality of annotation results with respect to the input text is received from the plurality of annotator devices. A user interface is provided at each annotator device that provides an interactive tool that the annotator user can use to select token and/or spans in each query or test question and then select corresponding label(s) (from the ontology associated with the annotation job) to annotate the selected token/span. As described above and in further detail below, how an annotator user answers the test questions will determine how much the annotator user's annotation results with respect to the queries will be considered, if at all, in the aggregate annotation report to be generated for the annotation job.

At 308, an aggregate annotation report corresponding to the annotation job is provided, wherein the aggregate annotation report combines the plurality of annotation results. In various embodiments, in generating the aggregate annotation report, the annotation results that have been submitted for each query of the input text are combined (excluding those submitted by annotator users with failing performances on the test questions associated with the annotation job) to generate aggregated labels (e.g., best/most likely answers) for each of at least some of the tokens/spans in the query.

Figure 4:
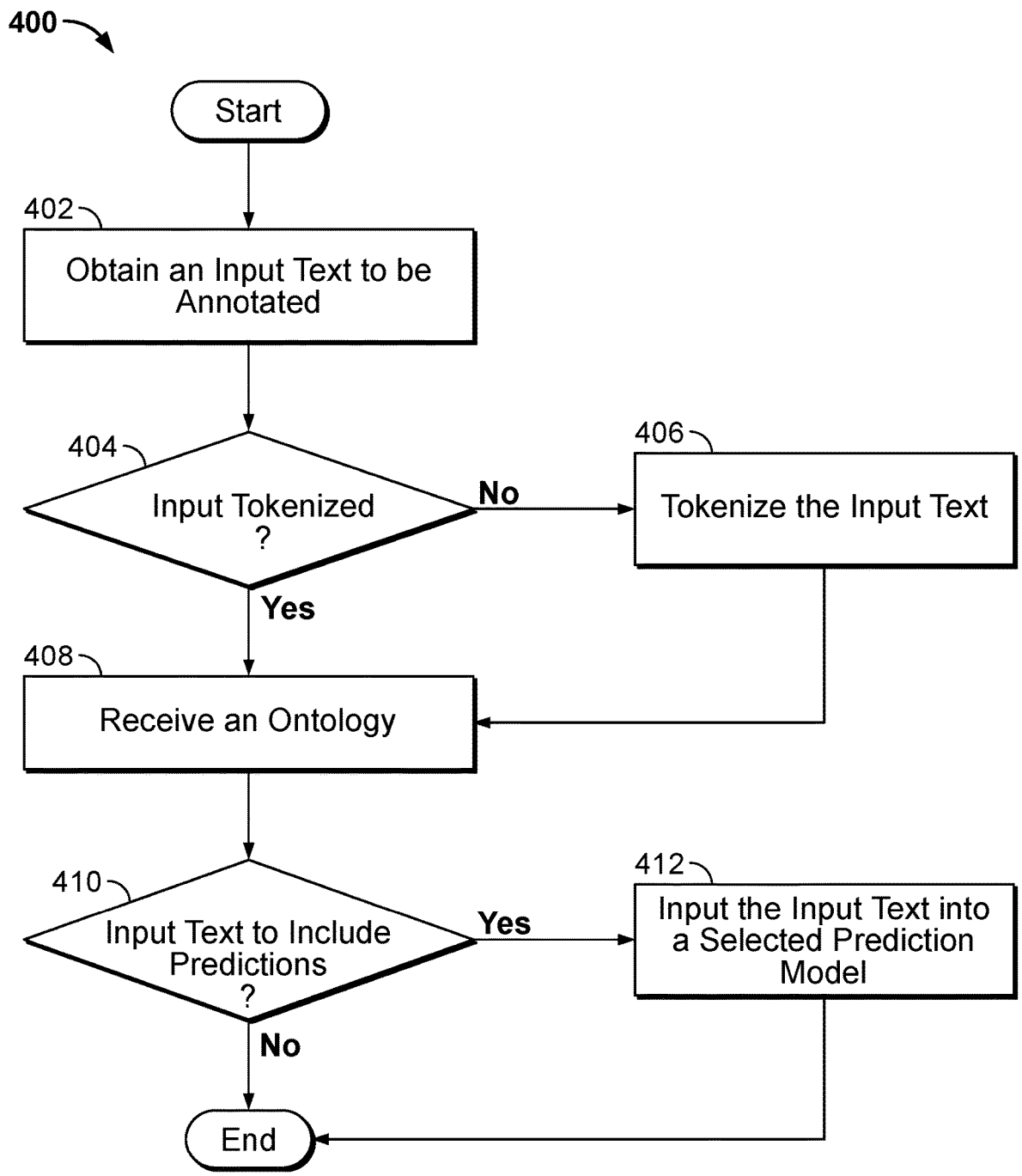
FIG. 4 is a flow diagram showing an example of a process for obtaining input text associated with an annotation job.

FIG. 4 is a flow diagram showing an example of a process for obtaining input text associated with an annotation job. In some embodiments, process 400 is implemented at an annotation platform server such as annotation platform server 116 of system 100 of FIG. 1. In some embodiments, step 302 of process 300 of FIG. 3 may be implemented using process 400.

At 402, an input text to be annotated is received. The input text is submitted by an annotation job creator user over a user interface provided by the annotation platform server. In some embodiments, the input text comprises a spreadsheet such as a CSV. In some embodiments, the input text comprises a set of queries. For example, each query comprises a sentence and, optionally, contextual information (e.g., the paragraph in which the sentence was found). For example, if the annotation job creator user is a data scientist/engineer at an enterprise, then the input text may be a large body of text that the enterprise has received and/or otherwise wants to analyze for the purposes of training a machine learning model. For example, the input text may comprise written reviews, transcribed phone calls, written customer service messages, and/or search queries that the enterprise has received (e.g., at the enterprise's website).

At 404, whether the input text is already tokenized is determined. In the event that the input text is already tokenized, control is transferred to 408. Otherwise, in the event that the input text is not already tokenized, control is transferred to 406. Since the minimum text-based unit on which annotation is to be performed by annotator users is a token (e.g., a word or a phrase that is semantically meaningful), the input text is to be tokenized if it is not already tokenized.

At 406, the input text is tokenized. In some embodiments, tokenizing the input text comprises dividing each query into one or more tokens, where each token is a single word/character or phrase (series of adjacent words/characters). In some embodiments, the type of tokenization that is performed may be selected by the annotator job creator job user based on the industry with which the user is associated and/or the language in which the input text is written.

At 408, an ontology is received. As mentioned above, the ontology comprises a set of labels (which are sometimes referred to "class names"). The labels of the ontology associated with the annotation job are to be presented at the user interface to be presented at an annotator device and can be selected by the annotator user to annotate any token or span (set of tokens) of the input text. In some embodiments, each label of the ontology includes a corresponding description that describes how and/or when to annotate with that label. In some embodiments, the ontology associated with an annotation job is customized and submitted by the annotation job creator user over a user interface. In some embodiments, the ontology is created by a third party and is selected by the annotator job creator user to use for the current annotation job.

At 410, whether the input text includes machine predictions is determined. In the event that the input text does not already include but is to include machine predictions, control is transferred to 412 where the input text is input into a selected prediction model. Otherwise, in the event that the input text does not already include but is not to include machine predictions, the process ends. In some embodiments, the annotator job creator user can select whether to apply machine learning model made annotations ("machine predictions") to the input text, if the input text does not already include machine predictions. For example, the annotator job creator user can select an existing third party machine learning model in which to input the input text such that the third party machine learning model is configured to output some machine made annotations with at least some of the input query. In some embodiments, the ontology third party machine learning model that is selected has an ontology that is consistent (e.g., does not conflict) with the ontology that has been selected for the annotation job (at step 408).

Figure 5:
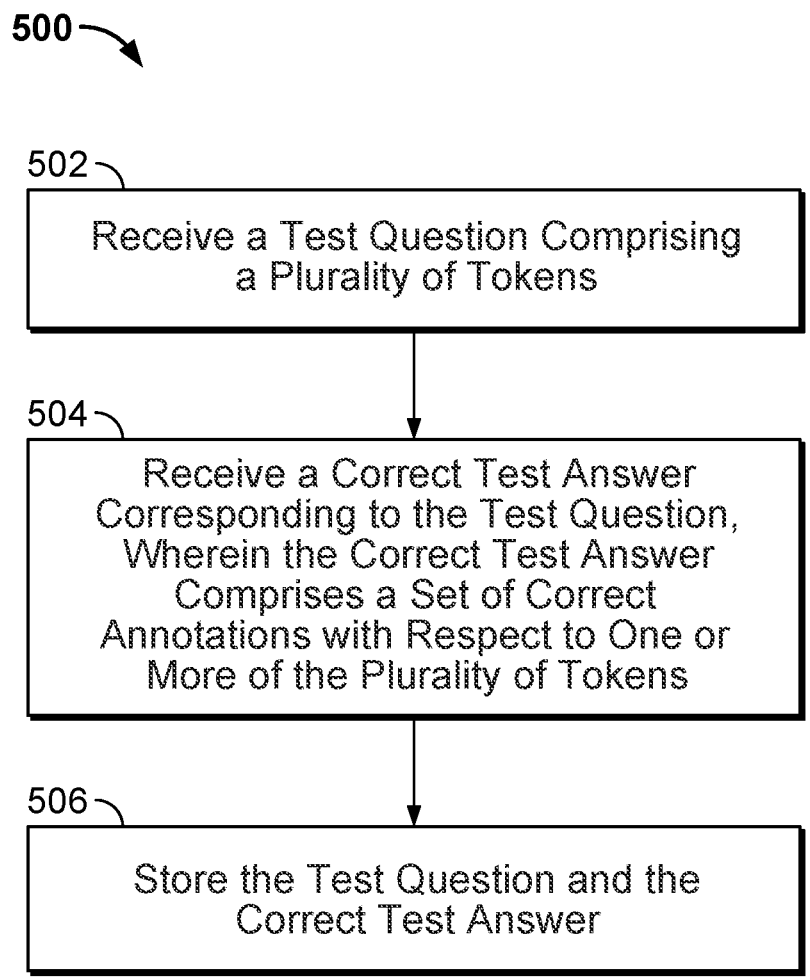
FIG. 5 is a flow diagram showing an example of a process for obtaining a test question associated with an annotation job.

FIG. 5 is a flow diagram showing an example of a process for obtaining a test question associated with an annotation job. In some embodiments, process 500 is implemented at an annotation platform server such as annotation platform server 116 of system 100 of FIG. 1.

Process 500 is an example process for receiving a test question and a corresponding correct test answer associated with an annotation job. In actual practice, process 500 may be repeated for the same annotation job as multiple test questions can be submitted for the same annotation job. For example, test questions of different levels of difficulty can be associated with an annotation job.

At 502, a test question comprising a plurality of tokens is received. For example, the test question may comprise a set of tokens with similar content to any query of the tokenized input text of the annotation job.

At 504, a correct test answer corresponding to the test question is received, wherein the correct test answer comprises a set of correct annotations with respect to one or more of the plurality of tokens. The correct annotations (comprising labels associated with the ontology associated with the annotation job) corresponding to each of at least some of the test question tokens (not every token of the test question needs to be annotated) are received as the correct test answer to the test question. In some embodiments, in addition to the correct test answer, a set of passing rules associated with the test question is also received, where the rules describe which type of discrepancy of an annotator user submitted annotation answer to the test question can result in the annotation answer being deemed as passing (correct).

At 506, the test question and the correct test answer are stored.

Figure 6:
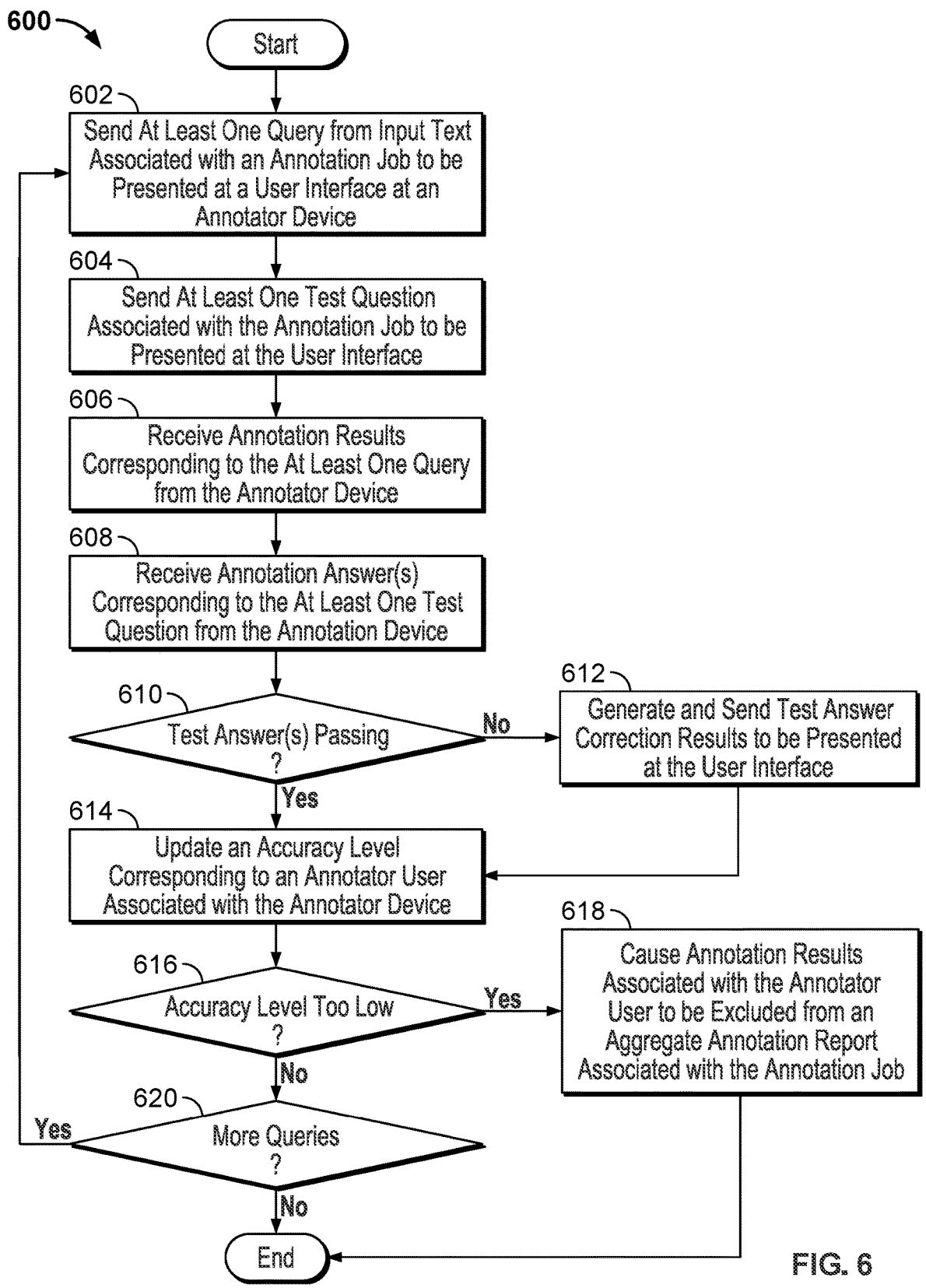
FIG. 6 is a flow diagram showing an example of a process for distributing the input text associated with an annotation job.

FIG. 6 is a flow diagram showing an example of a process for distributing the input text associated with an annotation job. In some embodiments, process 600 is implemented at an annotation platform server such as annotation platform server 116 of system 100 of FIG. 1. In some embodiments, step 304 of process 300 may be implemented using process 600.

At 602, at least one query from input text associated with an annotation job to be presented at a user interface is sent to an annotator device.

In some embodiments, an annotator user is selected to participate in an annotation job if the user's attributes meet a set of criteria that has been configured for the annotation job. For example, the set of criteria may describe a desired geographic location that an annotator user should live in, the minimum historical annotation experience that the annotator user needs to have, the desired historical work rate of the annotator user (e.g., how many queries have been historically annotated by the user per hour), and the maximum cost that the annotator user charges for his or her annotation services.

In some embodiments, the annotation platform can determine a geolocation associated with an annotator user based on the user's annotator device's IP address.

In some embodiments, the user interface is provided at the annotator device at a web browser.

At 604, at least one test question associated with the annotation job to be presented at the user interface is sent.

Both the queries of the input text and the test questions of the annotation job are presented at the same user interface (e.g., an interactive annotation tool) to be presented at the annotator device that is used by the annotator user. For example, for each query or test question, the query or the test question is presented (with any associated context content) with the ontology associated with the annotation job. The annotator user may interact with the user interface to select a single token or multiple adjacent tokens (to create a span) and then select a label from the ontology to use to annotate the selected token or span. The annotator user may annotate each token or fewer than all the tokens of a given query or test question. After the annotator user finishes annotating a query or a test question, he or she can make a selection at the user interface to submit the annotations to the annotation platform server.

In some embodiments, as soon as an annotator user selects a token or a span in a query or test question, the annotation platform server dynamically searches for and selects every other instance of that same token or span within the query or test question so that the annotator user can simultaneously annotate all instances of the same token or span with the same label that is selected from the ontology.

At 606, annotation results corresponding to the at least one query are received from the annotator device. The annotation results comprise the annotations that were made to tokens and spans of the query. Each token of a query may be annotated by the annotator user with zero or more labels.

At 608, annotation answer(s) corresponding to the at least one test question are received from the annotator device. The annotation answers comprise the annotations that were made to tokens and spans of the test question. Each token of a test question may be annotated by the annotator user with zero or more labels.

At 610, whether the test answer(s) are passing is determined. In the event that the test answer(s) are passing, control is transferred to 614. Otherwise, in the event that the test answer(s) are not passing, control is transferred to 612. The annotation answer corresponding to each test question is compared to the test question's corresponding correct test answer to determine whether the annotator user had passed the test question.

At 612, test answer correction results are generated and sent to be presented at the user interface. For each test question that the annotator user had failed, a page (e.g., a webpage) that describes the annotations that the user had made correctly and incorrectly is generated and presented at the user interface at the annotator device.

At 614, an accuracy level corresponding to an annotator user associated with the annotator device is updated. The annotator user's accuracy level is increased if the user had passed the test question(s) and decreased if the user had failed at least one test question.

At 616, whether the accuracy level corresponding to the annotator user is too low is determined. In the event that the accuracy level corresponding to the annotator user is too low (e.g., falls below a predetermined accuracy level threshold), control is transferred to 618. If the annotator user's accuracy level falls below a predetermined accuracy level threshold, then the annotator user is no longer considered to be trusted or reliable. Otherwise, in the event that the accuracy level corresponding to the annotator user is not too low (e.g., meets or exceeds a predetermined accuracy level threshold), control is transferred to 620.

At 618, annotation results associated with the annotator user are caused to be excluded from an aggregate annotation report associated with the annotation job. If the annotator user's accuracy level falls below a predetermined accuracy level threshold, then the annotator user's annotation results are disqualified from being included in the aggregate annotation report to be generated for the annotation job.

At 620, it is determined whether there is at least one more query of the input text that is to be distributed. In the event that there is at least one more query of the input text that is to be distributed, control is returned to 602. Otherwise, in the event that there are no more queries of the input text that are to be distributed, process 600 ends.

Figure 7:
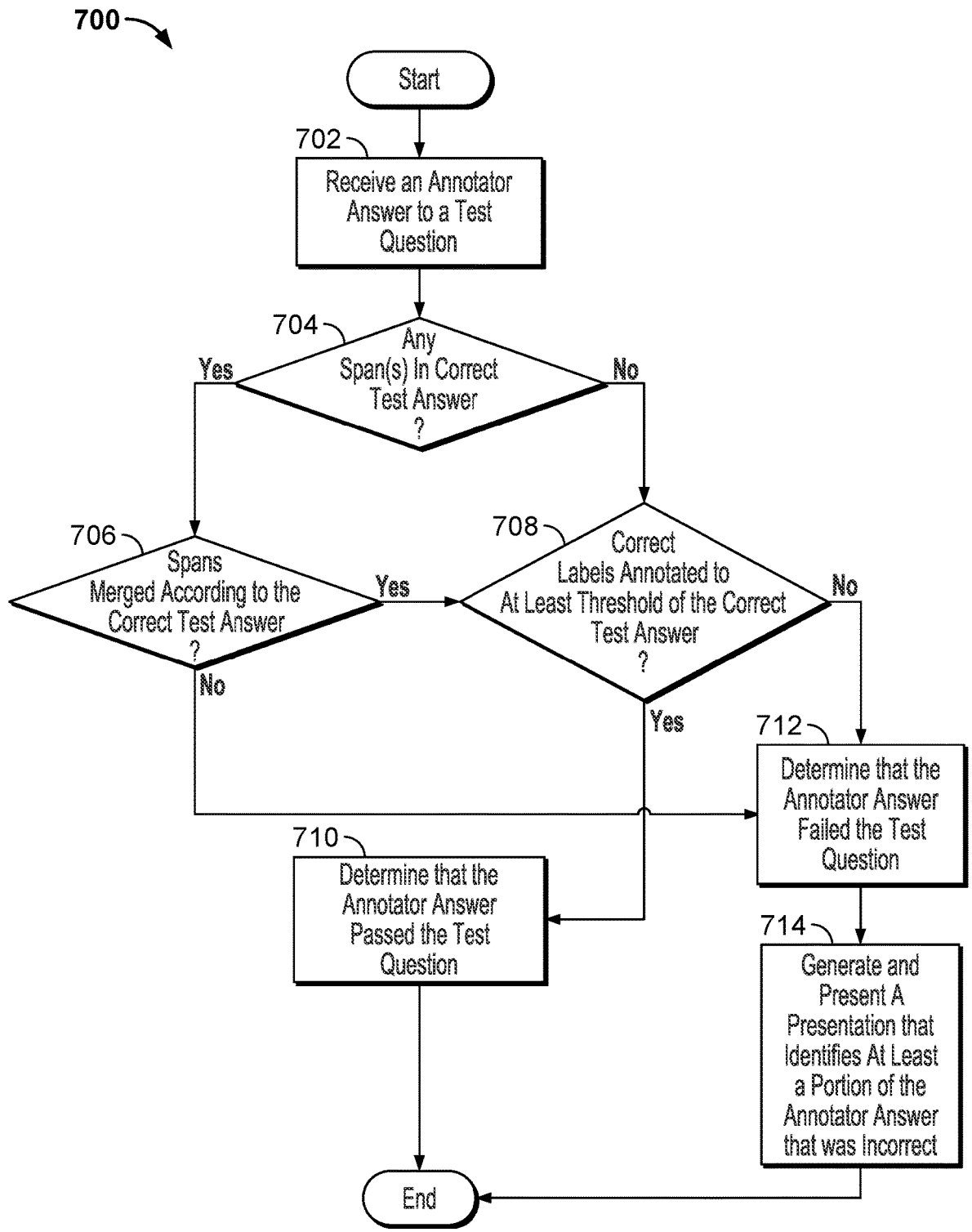
FIG. 7 is a flow diagram showing an example of a process for determining whether an annotator answer provided by an annotator user passes a test question associated with an annotation job.

FIG. 7 is a flow diagram showing an example of a process for determining whether an annotator answer provided by an annotator user passes a test question associated with an annotation job. In some embodiments, process 700 is implemented at an annotation platform server such as annotation platform server 116 of system 100 of FIG. 1. In some embodiments, step 610 of process 600 of FIG. 6 is implemented using process 700.

Process 700 includes example rules of determining whether an annotator user submitted answer to a test question (this answer is referred to as an "annotator answer") is correct, given the test question's stored corresponding correct test answer. In actual practice, other rules of determining whether an annotator answer that is submitted for a test question is correct may be implemented.

At 702, an annotator answer to a test question is received. The annotator answer is received from an annotator device that is used by the annotator user.

At 704, whether span(s) are part of a correct test answer is determined. If the correct test answer includes at least one span, then control is transferred to 706. Otherwise, if the correct test answer does not include any spans, then control is transferred to 708. The correct test answer may or may not include any spans (as mentioned above, each span is a set of adjacent two or more tokens).

At 706, whether span(s) in the annotator answer are merged in accordance with the correct test answer is determined. If the spans of the annotator answer are not merged in accordance with the correct test answer, then control is transferred to 712. Otherwise, if the spans of the annotator answer are merged in accordance with the correct test answer, then control is transferred to 708. In the event that the correct test answer includes at least one span, in the example of process 700, it is determined if the annotator answer has correctly merged all tokens in the test question to match the span(s) of the correct test answer. For example, if the test question were "I work at the John Smith Foundation" and the correct test answer included the span "John Smith" (where each of "John" and "Smith" were individual tokens), then the annotator answer must have correctly merged "John" and "Smith" together into a span. In the example of process 700, if the annotator answer failed to merge two tokens that are meant to be merged (according to the correct test answer), or merged two tokens that should not be merged (according to the correct test answer), then the annotator answer will have failed the test question regardless of the labels annotated/assigned to the tokens.

At 708, whether correct labels are annotated to at least the threshold of the correct test answer is determined. If at least the threshold number of correct labels in the annotator answer has been annotated, then control is transferred to 710. Otherwise, if fewer than the threshold number of correct labels in the annotator answer have been annotated, then control is transferred to 712. In the example of process 700, the annotator answer must correctly annotate (at least) the number of tokens/spans specified by the test question's corresponding token threshold. For example, the default setting will require 100% accuracy if there are between one and four tokens annotated. In another example, if four or more tokens are annotated, leniency may be introduced as the default by requiring 75% of the tokens (rounded down) to be correct.

At 710, it is determined that the annotator answer has passed the test question.

At 712, it is determined that the annotator answer has failed the test question.

At 714, a presentation that identifies at least a portion of the annotator answer that was incorrect is generated and presented. A page is dynamically generated that shows which tokens that the annotator user had correctly selected and/or annotated and/or which tokens that the annotator user had incorrectly selected and/or annotated. The page is then sent and presented on the annotator device for the annotator user to review and understand how to improve their annotation on future test questions and queries of the annotation job.

Figure 8:
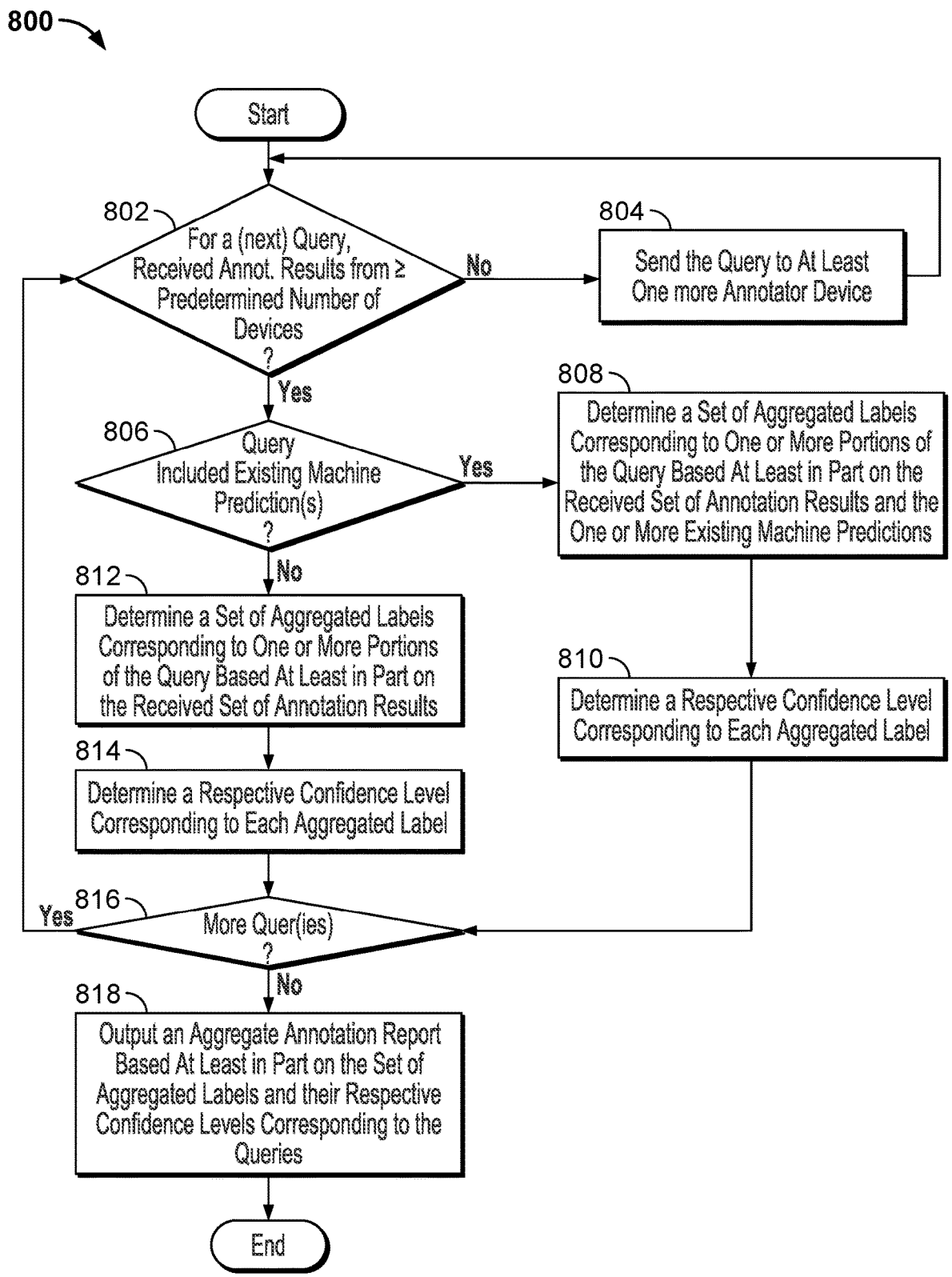
FIG. 8 is a flow diagram showing an example of a process for generating an aggregate annotation report associated with an annotation job.

FIG. 8 is a flow diagram showing an example of a process for generating an aggregate annotation report associated with an annotation job. In some embodiments, process 800 is implemented at an annotation platform server such as annotation platform server 116 of system 100 of FIG. 1. In some embodiments, step 308 of process 300 of FIG. 3 may be implemented, at least in part, using process 800.

At 802, for a (next) query, whether annotation results have been received from at least a predetermined number of devices is determined. In the event that annotation results from at least a predetermined number of devices have been received, control is transferred to 806. Otherwise, in the event that annotation results from fewer than the predetermined number of devices have been received, control is transferred to 804. For each query of the input text of an annotation job, it is determined whether the query has been annotated by at least a predetermined number of annotator users. This predetermined number of annotator users may be configurable (e.g., by the annotation job creator user or the annotation platform). For example, the predetermined number of annotator users is five.

At 804, the query is sent to at least one more annotator device. If fewer than the predetermined number of annotator users have submitted annotation results to the query, then the annotation results will not be aggregated for the query. As such, the query is sent to at least one more annotator device for a corresponding annotator user to annotate the query until annotation results are received from at least the predetermined number of annotator users. In some embodiments, even if at least the predetermined number of annotator users have submitted annotation results to the query, the query may be sent to additional annotator devices in the event that at least one of the annotator users that had submitted annotation results to the query were removed from the annotation job due to their corresponding accuracy level falling below a predetermined accuracy level threshold or due to other manual or automated quality control.

At 806, whether the query had included existing machine prediction(s) is determined. In the event that the query had included existing machine predictions, control is transferred to 808. Otherwise, in the event that the query had not included existing machine predictions, control is transferred to 812. As mentioned above, machine predictions refer to annotations that had been made by machine learning models on the query of the input text. For example, the input text uploaded by the annotation job creator user may have already been annotated by a machine learning model. In another example, the input text uploaded by the annotation job creator user was not already annotated but the annotation job creator user had requested for the annotation platform server to input the unannotated input text into a (e.g., third party) machine learning model.

At 808, a set of aggregated labels corresponding to one or more portions of the query is determined based at least in part on the received set of annotation results and the one or more existing machine predictions. Because each query has already been tokenized, annotator users can either annotate single tokens in the query or merge multiple adjacent tokens in the query together into a "span" and then annotate that span with a label from the ontology associated with the annotation job. For the query, the annotation results (labels) that had been submitted by all the annotator users for the same token or span are grouped together. Then, the aggregated label that is determined for each token or span is selected from the corresponding group of annotation results and also the machine prediction, if there is one. Also, for example, the most confident label among the group of annotator user submitted annotation results and machine prediction(s) associated with a token or a span is determined. For example, the confidence level associated with a unique annotator user submitted label or a machine prediction associated with a token or a span is determined as a function of the number of times that the label appears in the group, the total number of total labels in the group, the corresponding accuracy levels (e.g., a percentage value) of each non-excluded annotator user that had submitted a label for that token or span, and/or the accuracy level of each machine prediction for that token or span. For example, the corresponding accuracy level for a machine prediction could be weighted equally to a single human annotation, weighted equally to the aggregated human annotation results, or through a more complicated heuristic. Then, the aggregated label corresponding to the token or span may be selected as whichever label among the group of annotator user submitted annotation results and the machine prediction that has the highest corresponding confidence level.

At 810, a respective confidence level corresponding to each aggregated label is determined. As mentioned above, the confidence level corresponding to the aggregated label of a token or span is determined as a function of the number of times that that label appears in the group, the total number of total labels in the group, the corresponding accuracy levels (e.g., a percentage value) of each non-excluded annotator user that had submitted a label for that token or span, and/or the accuracy level of each machine prediction for that token or span.

At 812, a set of aggregated labels corresponding to one or more portions of the query is determined based at least in part on the received set of annotation results. For the query, the annotation results (labels) that had been submitted by all the annotator users for the same token or span are grouped together. Then, the aggregated label that is determined for each token or span is selected from the corresponding group of annotation results. For example, the most confident label among the group of annotator user submitted annotation results associated with a token or a span is determined as the aggregated label corresponding to the token or span.

At 814, a respective confidence level corresponding to each aggregated label is determined. For example, the confidence level corresponding to the aggregated label of a token or span is determined as a function of the number of times that that label appears in the group, the total number of total labels in the group, and the corresponding accuracy levels (e.g., a percentage value) of each non-excluded annotator user that had submitted a label for that token or span. For example, in the case where three annotator users had submitted labels for a token, each such annotator user would have an accuracy level (or "trust score") that is determined based on his or her test question accuracy level in the annotation job. Assume that these trust scores are respectively 0.7, 0.9, and 0.95 for the three annotator users. Also, assume that annotator users respectively submitted labels A, A, and B for the same token. The confidence level of label A, the most frequently occurring label, for example, would be the sum of the trust scores for those who submitted label A divided by the sum of the trust scores for all non-excluded annotator users. In this example, the confidence level of label A would be (0.7+0.9)/(0.7+0.9+0.95) or about 0.6275. The confidence level of label B would be 0.95/(0.7+0.9+0.95) or about 0.373. As such, label A would be selected as the aggregated label for the token because it is the label with the highest confidence level.

At 816, whether there is at least one more query in the annotation job is determined. In the event that there is at least one more query in the annotation job for which corresponding annotation results are to be aggregated, control is returned to 802. Otherwise, in the event that there are no more queries in the annotation job for which corresponding annotation results are to be aggregated, control is transferred to 818.

At 818, an aggregate annotation report based at least in part on the set of aggregated labels and their respective confidence levels corresponding to the queries is output. In some embodiments, the aggregate annotation report corresponding to an annotation job includes, for each query of the input text of the annotation job, one or more of the following: identifying information associated with each token or span in the query, the aggregated label determined for that token or span, the confidence level corresponding to the aggregated label determined for that token or span, whether the aggregated label determined for that token or span was annotated by a machine learning model or humans (annotator users), and whether any discrepancy exists between the annotation results submitted for that token or span by annotator users and the machine prediction made for that token or span by a machine learning model.

As such, in some embodiments, the aggregate annotation report includes aggregated annotation results on a query-by-query basis so that the annotation job creator user can potentially use the report to specifically improve/update a machine learning model based on the aggregated annotation results for individual queries. In some embodiments, the aggregate annotation report is in the JSON format. In some embodiments, a visual presentation (e.g., a matrix, a chart, and/or other graphical illustrations) can be generated based on the aggregate annotation report to graphically denote, at least, the aggregated label that has been determined for each token and/or span of each query and/or whether the annotation results submitted by annotation users for the token and/or span of each query differed from the machine prediction made for the same token and/or span, so that a user can receive all the pertinent information at a glance from the visualization. In particular, queries for which discrepancies existed between machine predictions and annotator users submitted annotation results may highlight the specific deficiencies of the machine learning model that had been used to make the machine predictions (based on the assumption that the annotator user submitted annotation results are more accurate than the machine learning model's results).

Figure 9:
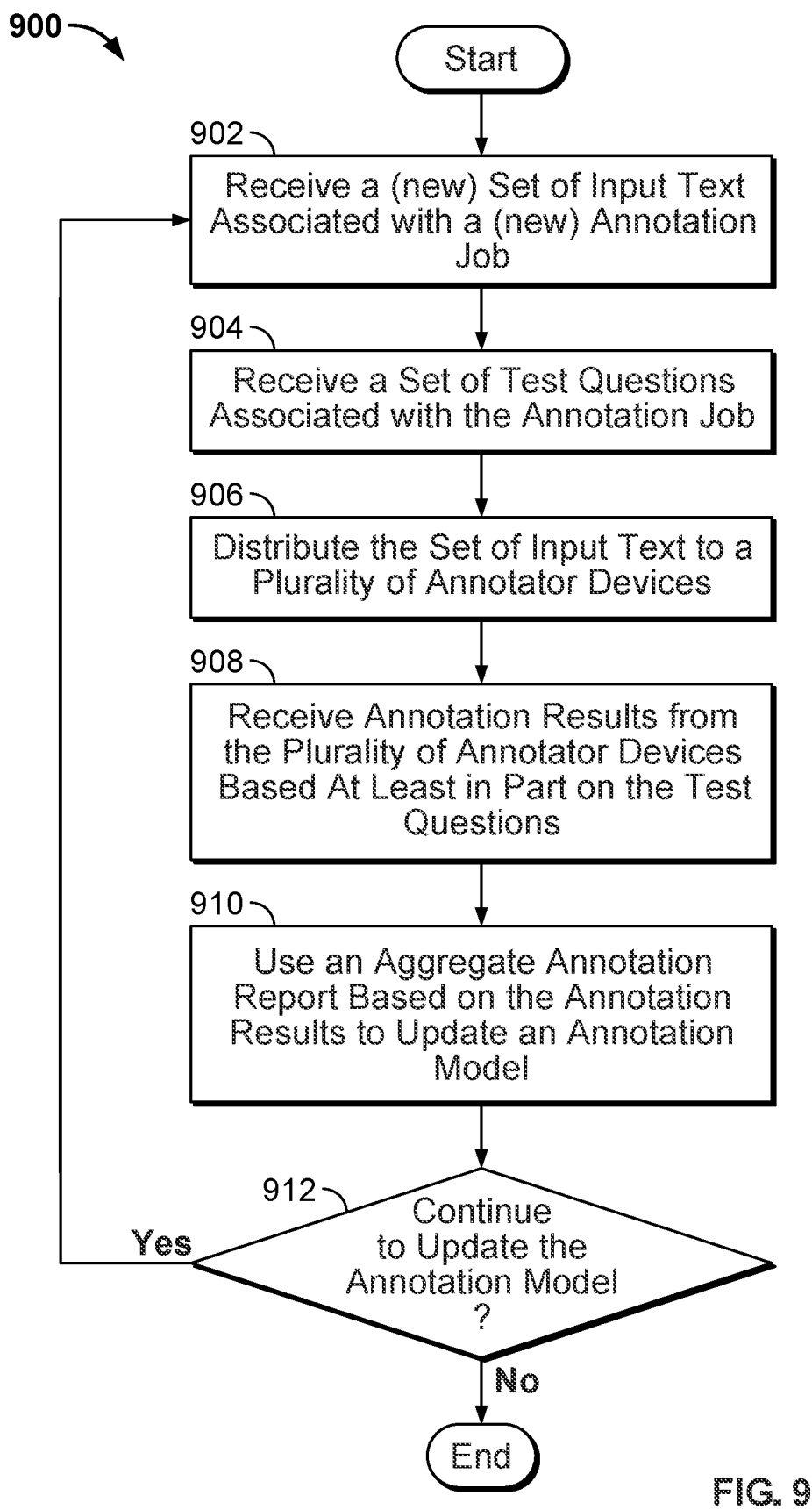
FIG. 9 is a flow diagram showing an example of a process for continuously updating a machine learning model for performing text annotations.

FIG. 9 is a flow diagram showing an example of a process for continuously updating a machine learning model for performing text annotations. In some embodiments, process 900 is implemented at an annotation platform server such as annotation platform server 116 of system 100 of FIG. 1.

At 902, a (new) set of input text associated with a (new) annotation job is received. For example, as new input text (e.g., customer submitted text) becomes available to a data scientist/engineer at an enterprise, he or she may want to annotate such data to use as training data to either create a new or update a machine learning model (an annotation model) for performing text annotations to better recognize the language in the new input text. Where a machine learning model already exists, the input text may also be run through that model to add machine predictions to at least some of the tokens/spans of the input text before it is annotated by annotator users.

At 904, a set of test questions associated with the annotation job is received.

At 906, the set of input text is distributed to a plurality of annotator devices.

At 908, annotation results are received from the plurality of annotator devices based at least in part on the test questions.

At 910, an aggregate annotation report based on the annotation results is used to update an annotation model. As described above, the aggregate annotation report can provide aggregated annotations for the tokens/spans of each query of the input query and/or identify discrepancies between any existing machine predictions in the input text and the annotator user provided annotation results (e.g., deficiencies in the existing annotation model). As such, an existing annotation model (e.g., the same model that might have provided the machine predictions in the input text received at 902) can be precisely updated based on the annotator users submitted annotation results. As mentioned above, any annotation results submitted by an annotator user whose accuracy level (which is determined as a function of the user's provided answers to the test questions associated with the annotation job) falls below a threshold will be excluded from the aggregate annotation report so as to programmatically ensure a high level of quality associated with the annotation results that are actually used to generate the report.

At 912, whether the annotation model should continue to be updated is determined. In the event the annotation model should continue to be updated, control is returned to 902. Otherwise, in the event the annotation model should not continue to be updated, process 900 ends. Additional annotation jobs can be run on new input text to continuously improve an annotation model as process 900 is repeatedly performed, to potentially alternatively leverage any existing machine prediction power that is provided by the annotation model and the annotation abilities of a large number of annotator users.

Figure 10A:
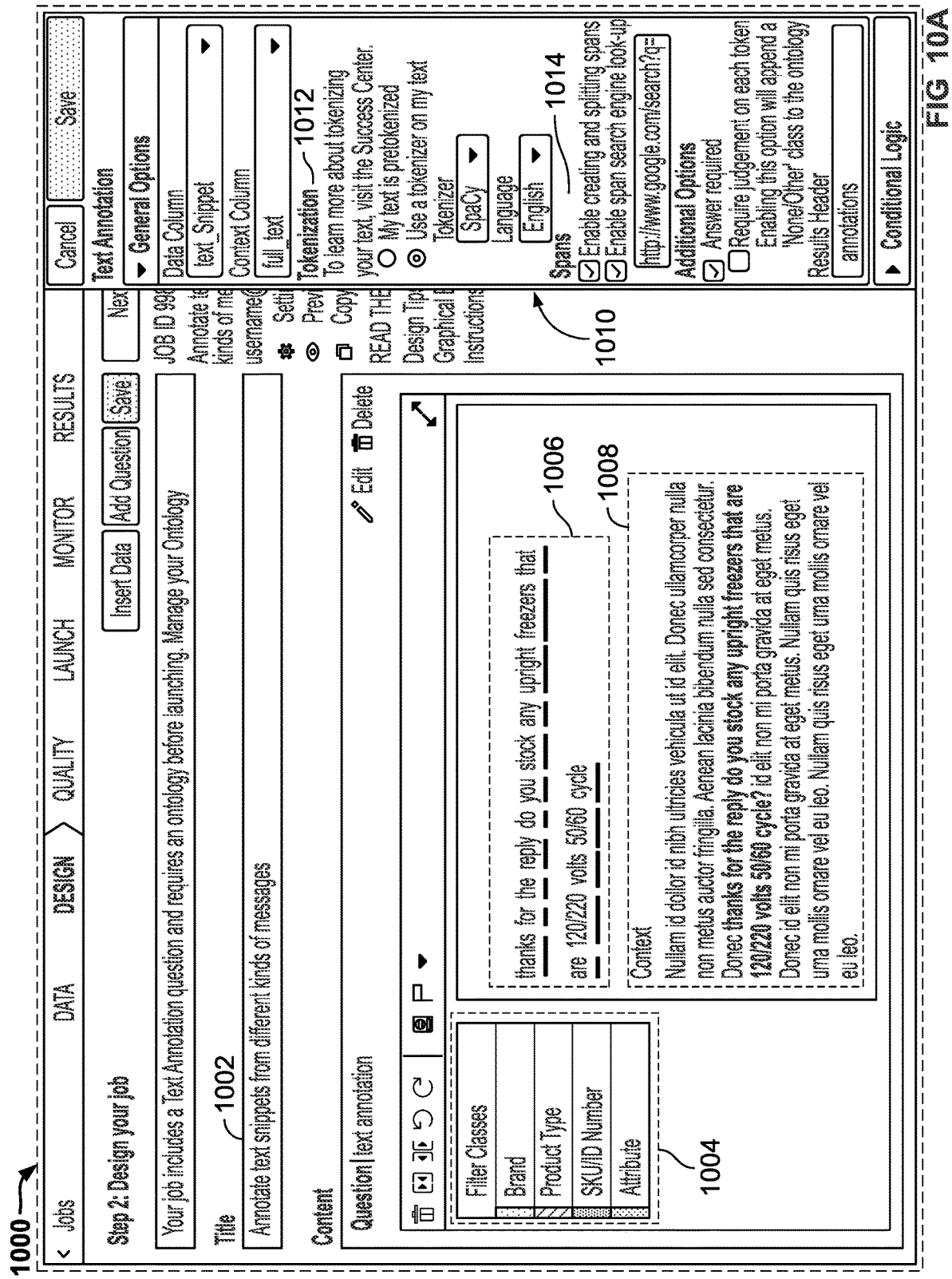
FIG. 10A is a diagram showing a first example user interface to be presented at an annotation job management device for receiving an annotation job.
Figure 10B:
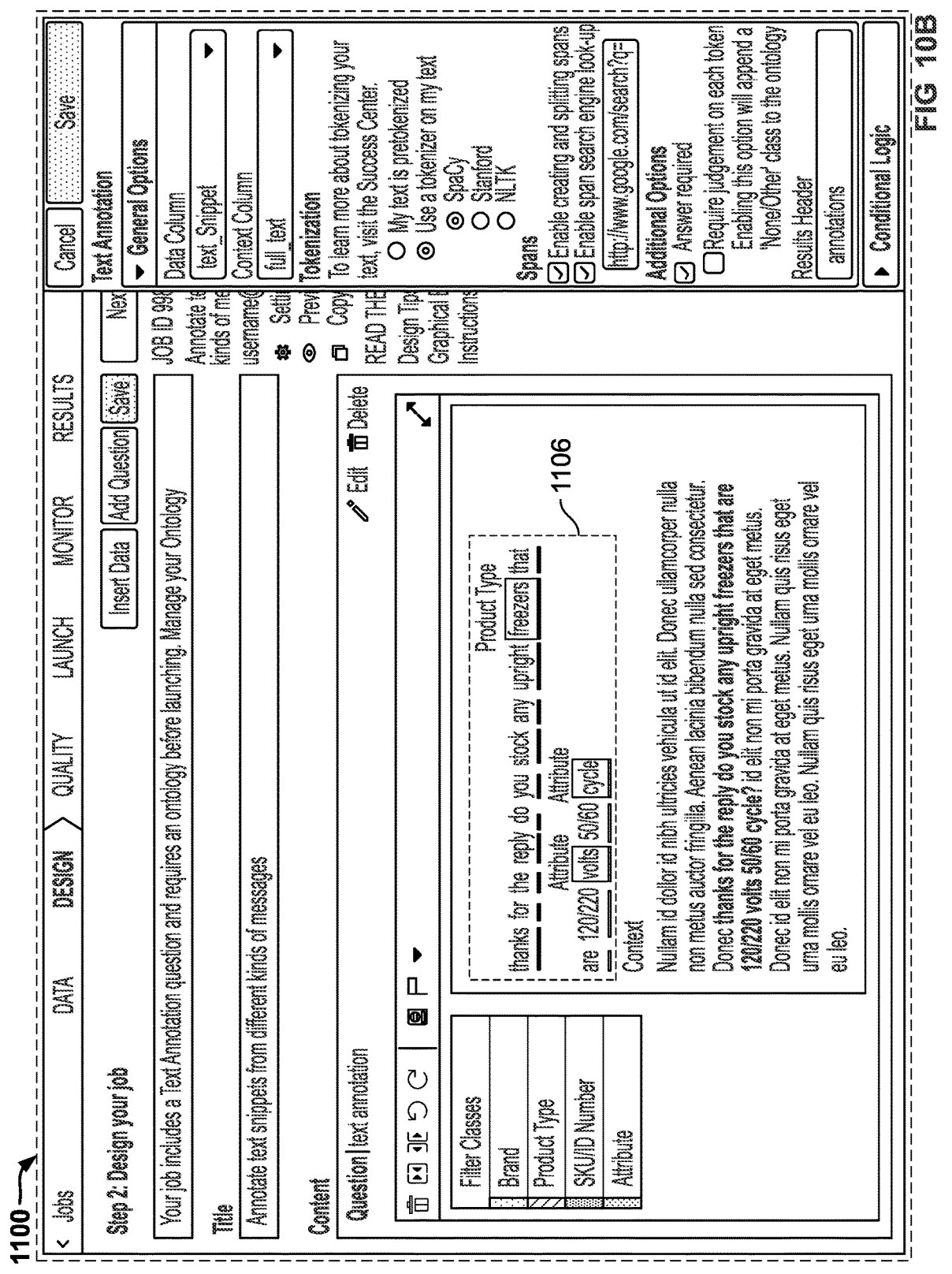

FIGS. 10A-10C below show example user interfaces to be presented at an annotation job management device in connection with viewing information associated with the input text associated with an annotation job.

FIG. 10A is a diagram showing a first example user interface to be presented at an annotation job management device for receiving an annotation job. In the example of FIG. 10A, user interface 1000 is presented by an annotation platform server at an annotation job management device for an annotation job creator to submit and customize an annotation job. Menu 1010 shows various interactive elements with which the annotation job creator user can use to describe the input text, request processing on the input text, and/or configure other attributes associated with the input text associated with the present annotation job. For example, tokenization submenu 1012 allows the annotation job creator user to indicate whether the input text is already tokenized or not and if not, then to potentially request for the not tokenized input text to be tokenized by a selected third party tokenization service (e.g., spaCy). Tokenization submenu 1012 also indicates the language of the input text. In another example, span submenu 1014 allows the annotation job creator user to specify/configure whether an annotator user can merge multiple tokens of a query or test question into a span and also, the web address of a search engine that the annotator user can refer to determine which tokens should be merged into spans. To the left of menu 1010, user interface 1000 shows information pertaining to one particular query of the uploaded input text including title 1002, ontology menu 1004 associated with the annotation job, query content 1006, and query context 1008. Ontology menu 1004 shows the four labels (Brand, Product Type, SKU/ID Number, and Attribute) that have been configured in the ontology that has been selected for the annotation job. Query content 1006 shows the sentence that is the query. In query content 1006, each separate token is underlined in gray. As will be contrasted with the example of FIG. 10B, below, query content 1006 does not already include existing annotations (machine predictions). Query context 1008 shows contextual text for query content 1006 (e.g., to help the annotator user better understand the context in which query content 1006 arose). Specifically, query context 1008 shows the entire paragraph from which query content 1006 was obtained.

FIG. 10B is a diagram showing a second example user interface to be presented at an annotation job management device for receiving an annotation job. In the example of FIG. 10B, user interface 1100 includes query content 1106 that already includes some annotations. For example, these annotations (machine predictions) were performed by a machine learning model that is configured to annotate tokens according to the labels of an ontology. In query content 1106, the token "freezers" was annotated with the Product Type label, the token "volts" was annotated with the Attribute label, and the token "cycle" was annotated with the Attribute label.

FIG. 10C is a diagram showing a user interface to be presented at an annotation job management device for presenting queries associated with an annotation job. User interface 1200 shows a list of the queries that belong to input text that has been submitted for a current annotation job. In the example of FIG. 10C, each row in the list shows identifying information and the preview of the content of each query as well its state and the number of judgments (sets of annotation results) that had been received at the annotation platform server for that query.

Figure 11A:
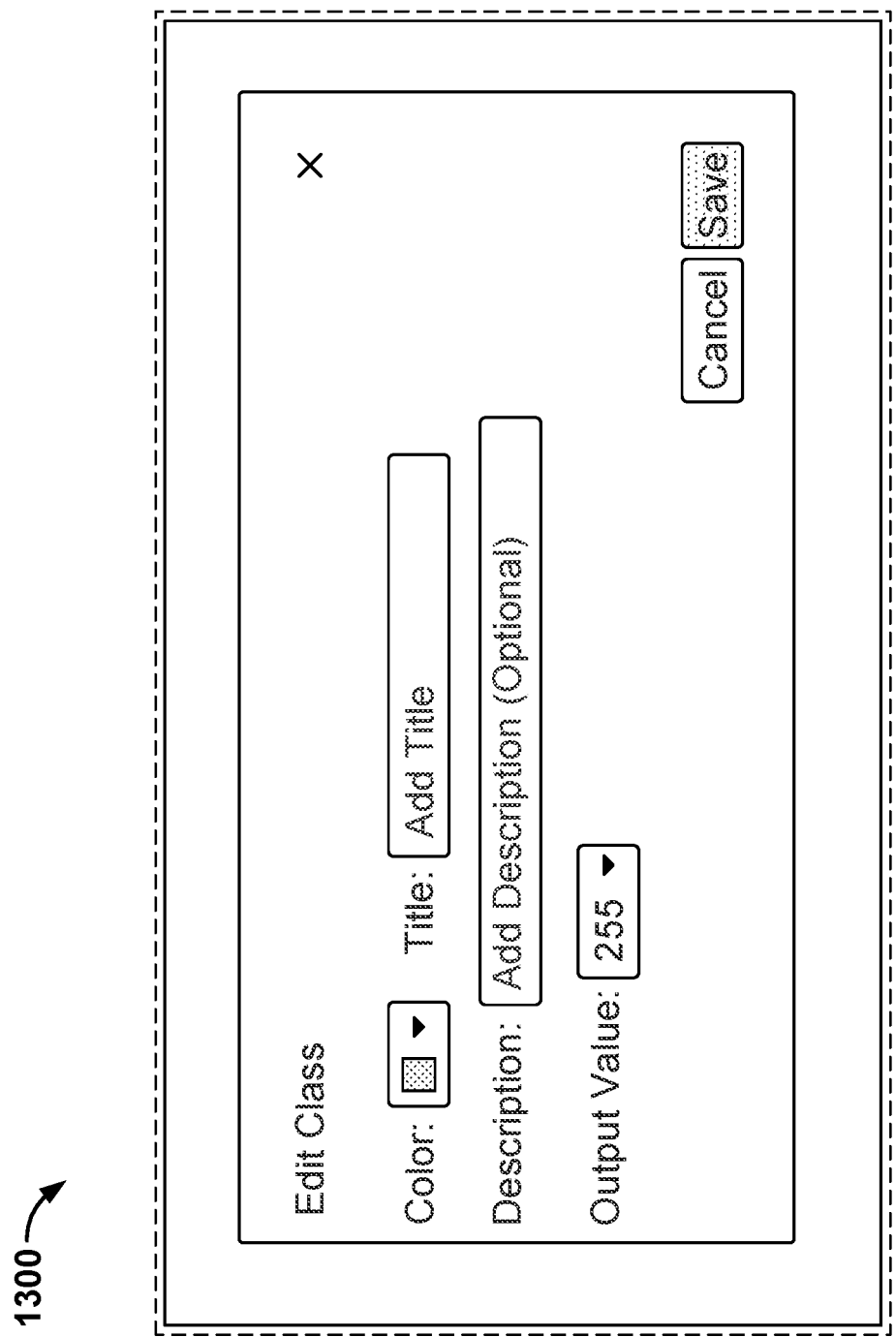
FIG. 11A is a diagram showing an example user interface to be presented at an annotation job management device for customizing a particular class (label) of an ontology for an annotation job.
Figure 11C:
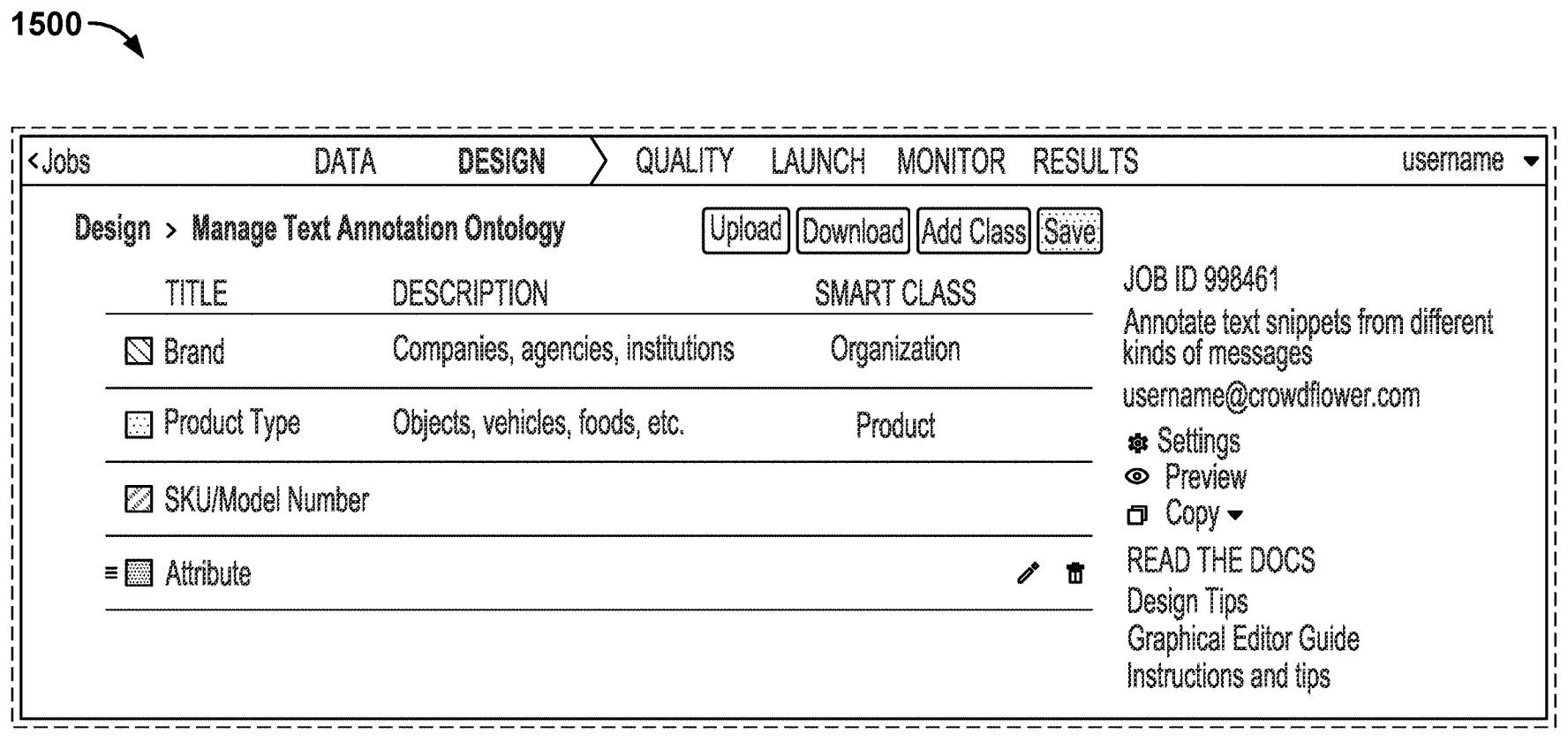

FIGS. 11A-11C below show example user interfaces to be presented at an annotation job management device in connection with uploading an ontology for an annotation job.

FIG. 11A is a diagram showing an example user interface to be presented at an annotation job management device for customizing a particular class (label) of an ontology for an annotation job. In the example of FIG. 11A, user interface 1300 provides interactive elements for an annotation job creator user to select a particular color associated with the class/label (this color will be used to highlight/underline a token or span that has been labeled with this class/label), a title of the class/label, a description of the class/label (e.g., such as instructions on when to annotate a token/span with the class/label), and a corresponding output value associated with the class/label. For example, a corresponding output value associated with the class/label can allow for the quick verification of annotation results. For example, the company that runs an annotation job may have human readable classes that are appropriate to show annotator users and for quickly verifying that the data looks correct. These classes may have a corresponding output value that would typically correspond with how these classes are represented in the company's database or some other external database. For example, suppose a car company is trying to identify mentions of different automobiles such as "Acme F150" and "Acme Focus." These human readable class names could have values associated with them such as "acme_f150," "acme_truck," or a product ID such as a UPC code which would be the value stored in company databases and other data sources for finding the item.

FIG. 11B is a diagram showing an example user interface to be presented at an annotation job management device for presenting a customized list of classes (labels) of an ontology associated with an annotation job. In the example of FIG. 11B, user interface 1400 shows a list of classes/labels that have been configured (e.g., by an annotation job creator user) for the present annotation job. Each row in the list includes configured information (e.g., configured using a user interface such as user interface 1300 of FIG. 11A) associated with the class/label such as the class/label's title, description, and output value.

FIG. 11C is a diagram showing another example user interface to be presented at an annotation job management device for presenting a customized list of classes (labels) of an ontology associated with an annotation job. As compared to the example user interface of FIG. 11B, the example of user interface 1500 of FIG. 11C shows a more complex case where an annotation job creator job has connected the ontology classes up to one or more existing annotation machine learning models in order to automatically identify those in the text. In user interface 1500 of FIG. 11C, the "Brand" class has been connected to "Organization," which is one of the classes that an existing annotation machine learning model can predict in text. So, as a result of electing to use an existing annotation machine learning model to add machine predictions with respect to text associated with the Brand label, the input text that does not have any machine predictions will be pre-annotated with brand labels before the input text is distributed to annotator users. Using an existing annotation machine learning model to pre-label the input text before distributing the input text to annotator users will enable the annotator users to quickly and accurately perform their work.

FIGS. 12A-12F below show example user interfaces to be presented at an annotation job management device in connection with configuring a test question for an annotation job.

Figure 12A:
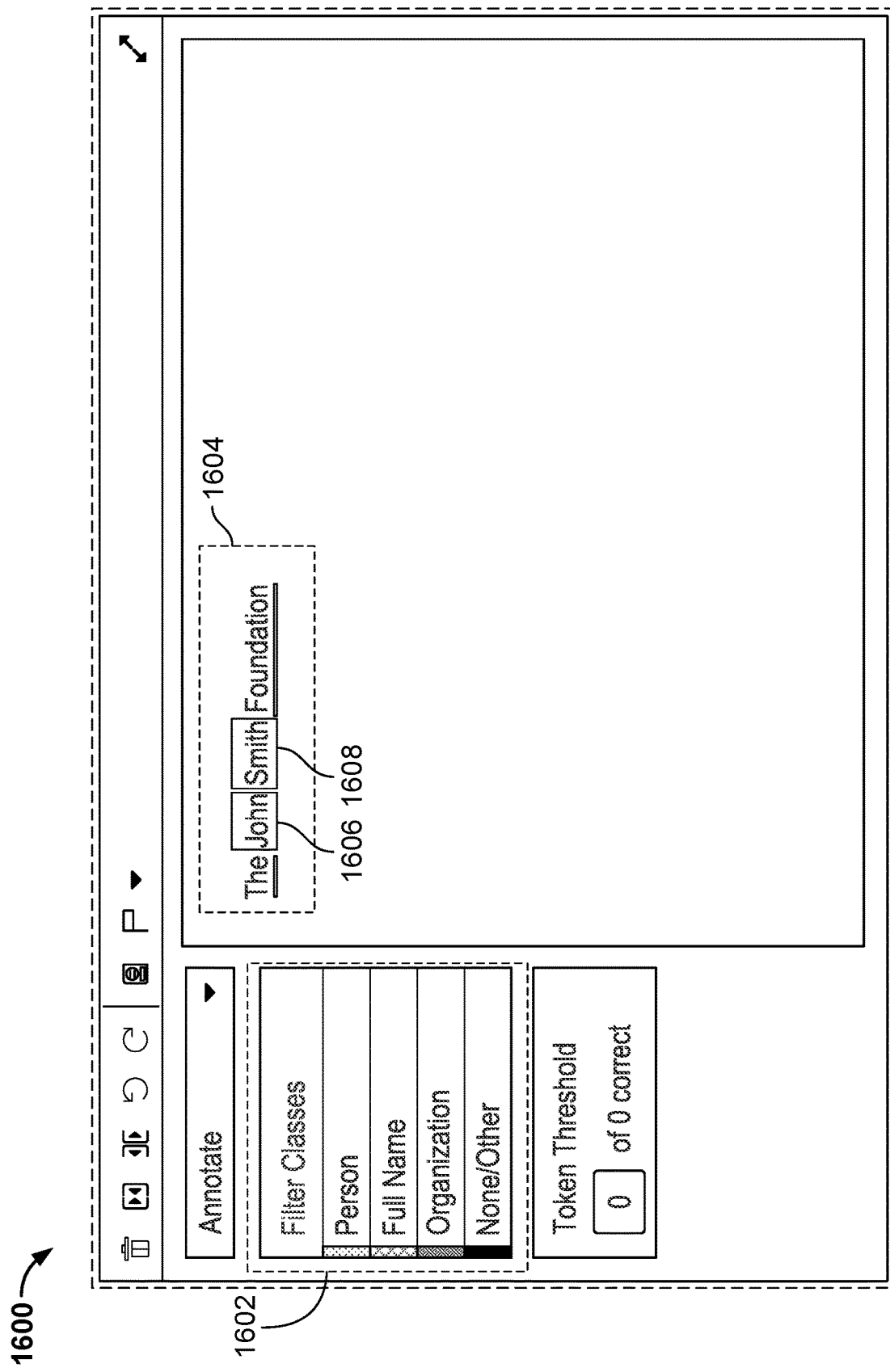
FIG. 12A is a diagram showing a first example user interface to be presented at an annotation job management device to enable an annotation job creator user to configure a correct test answer corresponding to a test question for an annotation job.

FIG. 12A is a diagram showing a first example user interface to be presented at an annotation job management device to enable an annotation job creator user to configure a correct test answer corresponding to a test question for an annotation job. As shown in the example of FIG. 12A, user interface 1600 provides test question 1604, which is a sentence that states "The John Smith Foundation." Test question 1604 includes the following four tokens: "The," "John, "Smith," and "Foundation." User interface 1600 provides a tool with which the annotation job creator user can select token(s) and/or span(s) in test question 1604 and then annotate/assign to each such selected token and span a corresponding label from ontology menu 1602. Ontology menu 1602 includes four labels: Person, Full Name, Organization, and None/Other. In the example of user interface 1600, the annotation job creator user has selected separate tokens "John" 1606 and "Smith" 1608 in the course of configuring a correct answer to test question 1604. As will be shown across FIGS. 12B-12F, a correct test answer to a test question comprises one or more selected tokens/spans of the test question and one or more correct label annotations to each of such selected tokens/spans.

Figure 12B:
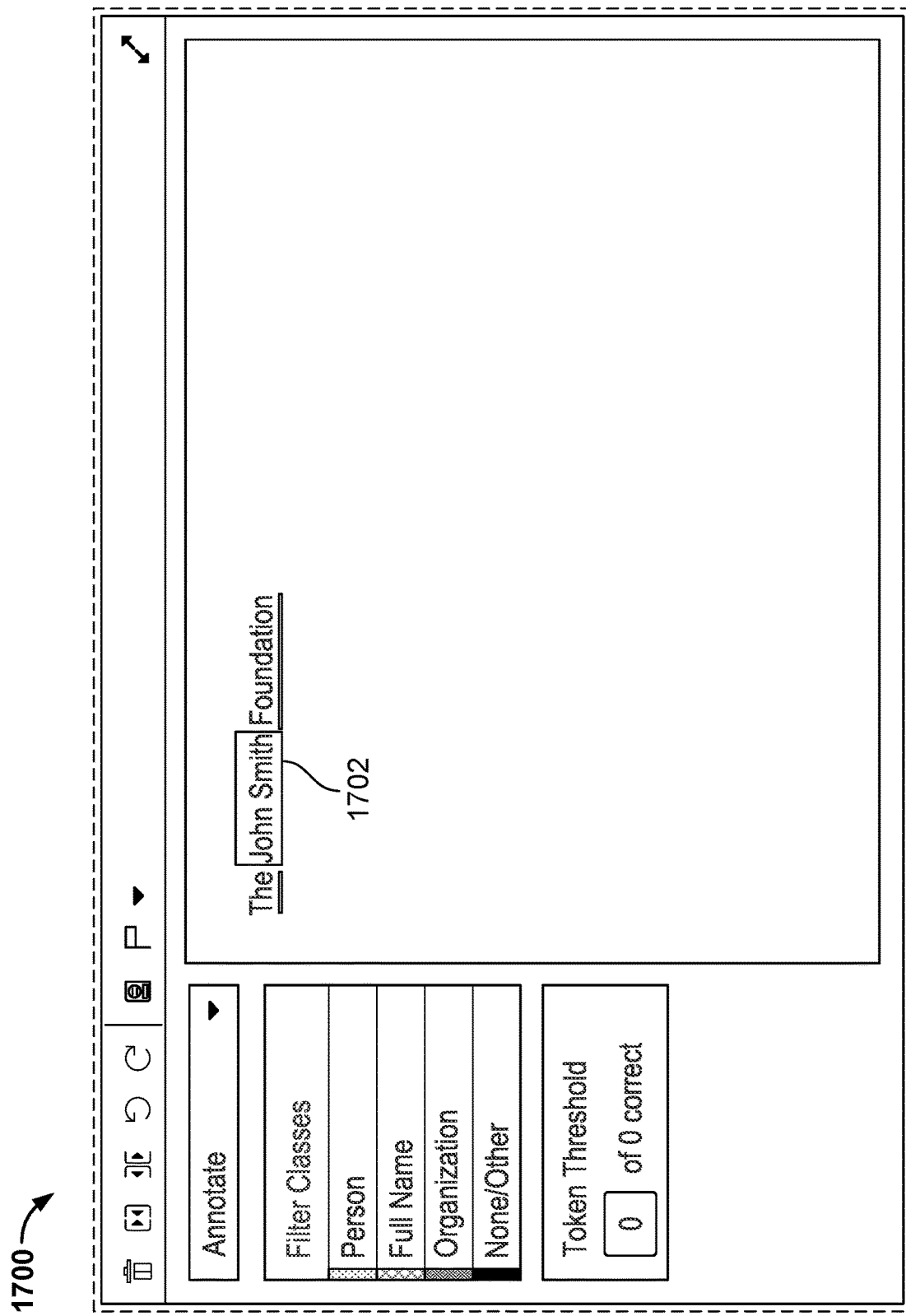
FIG. 12B is a diagram showing a second example user interface to be presented at an annotation job management device to enable an annotation job creator user to configure a correct test answer corresponding to a test question for an annotation job.

FIG. 12B is a diagram showing a second example user interface to be presented at an annotation job management device to enable an annotation job creator user to configure a correct test answer corresponding to a test question for an annotation job. For example, user interface 1700 is presented after the annotation job creator merges separately selected tokens "John" and "Smith" of the test question into span "John Smith" 1702 in anticipation of providing one or more labels annotation to span "John Smith" 1702 in the correct test answer.

Figure 12C:
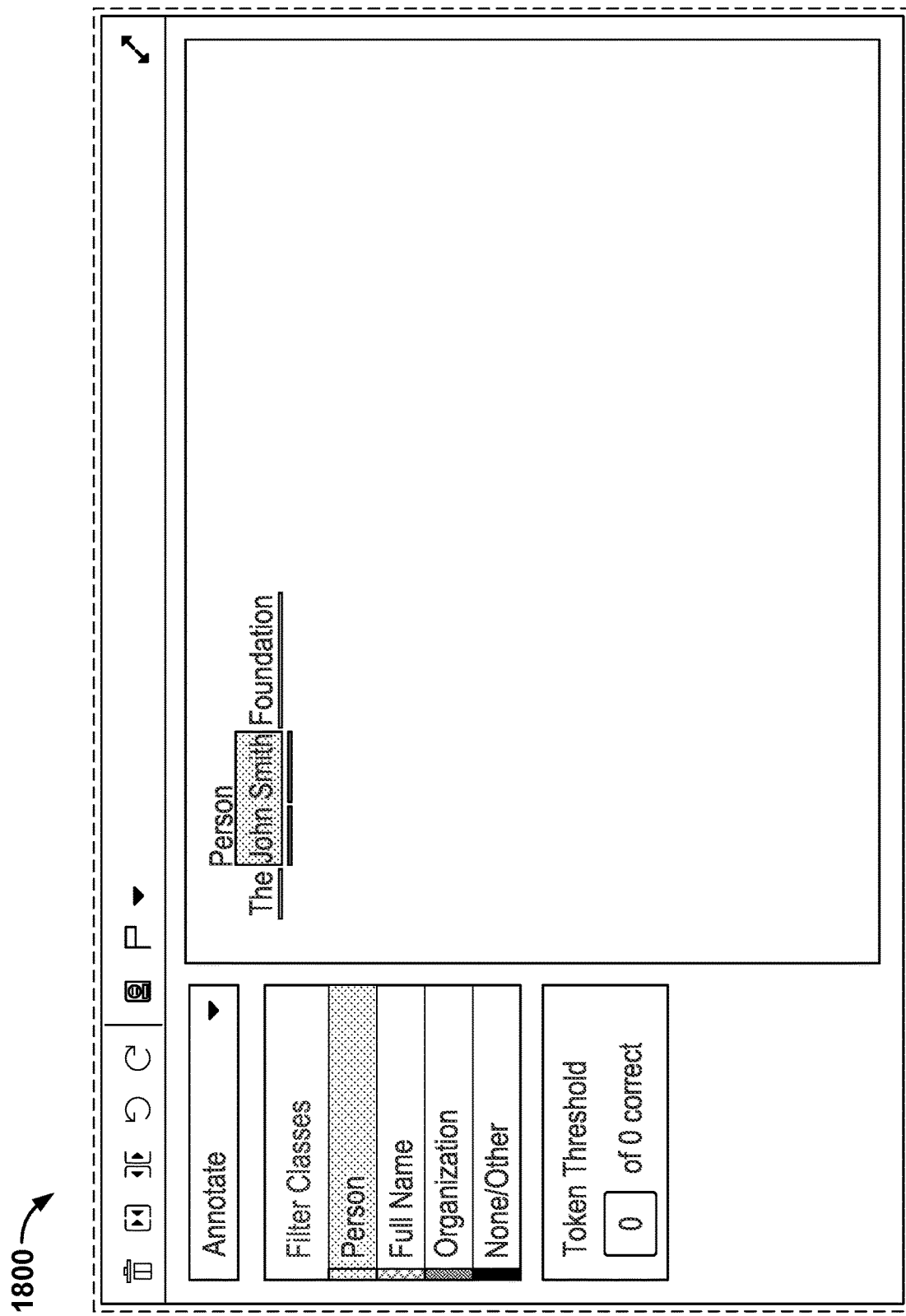
FIG. 12C is a diagram showing a third example user interface to be presented at an annotation job management device to enable an annotation job creator user to configure a correct test answer corresponding to a test question for an annotation job.

FIG. 12C is a diagram showing a third example user interface to be presented at an annotation job management device to enable an annotation job creator user to configure a correct test answer corresponding to a test question for an annotation job. For example, user interface 1800 is presented after the annotation job creator user selects to annotate selected span "John Smith" of the test question with the Person label from the ontology menu. As a result of the annotation job creator user's annotation in user interface 1800, the correct test answer for test question "The John Smith Foundation" includes at least the Personal label annotation for the span "John Smith."

Figure 12D:
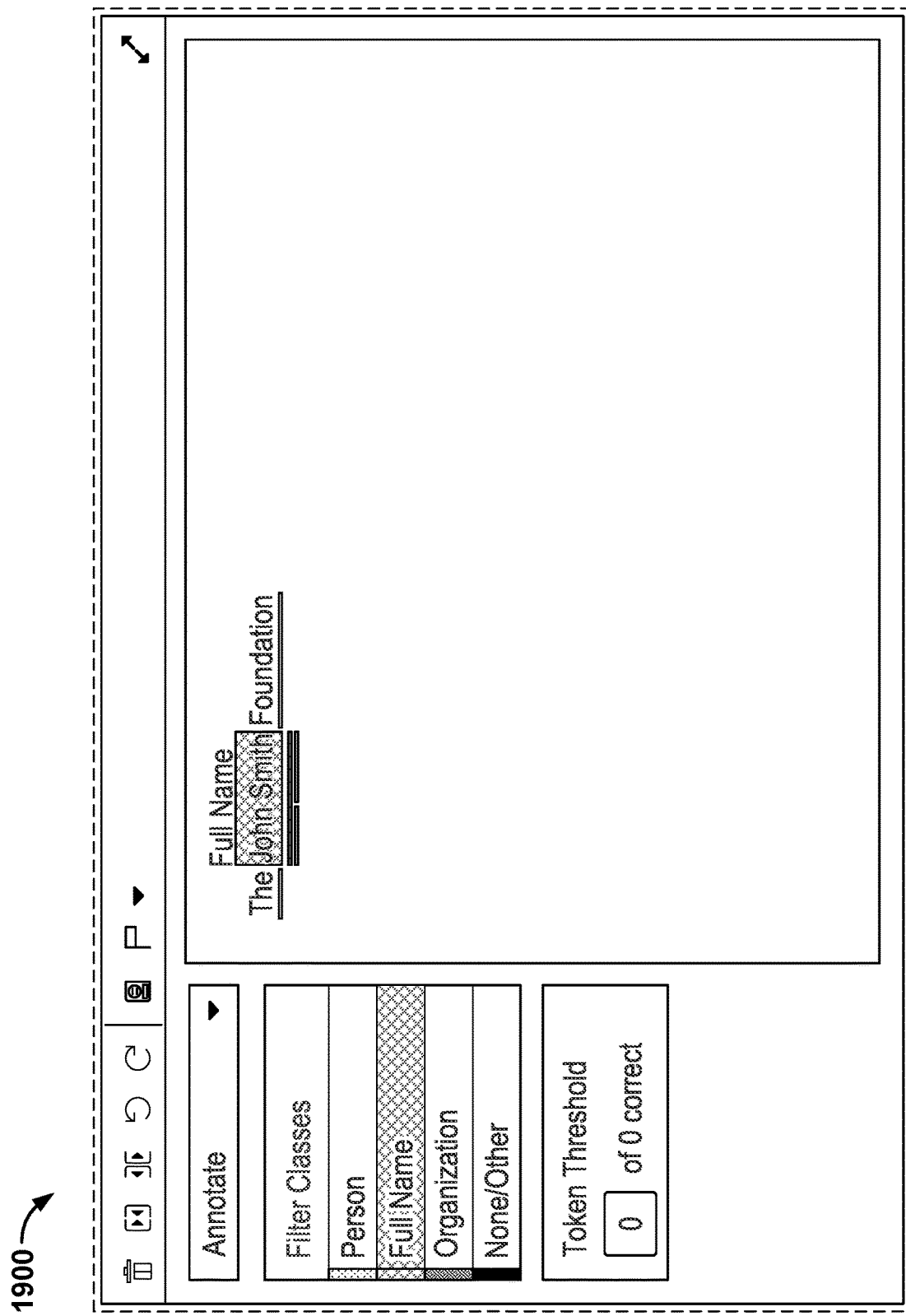
FIG. 12D is a diagram showing a fourth example user interface to be presented at an annotation job management device to enable an annotation job creator user to configure a correct test answer corresponding to a test question for an annotation job.

FIG. 12D is a diagram showing a fourth example user interface to be presented at an annotation job management device to enable an annotation job creator user to configure a correct test answer corresponding to a test question for an annotation job. For example, user interface 1900 is presented after the annotation job creator user selects to further annotate selected span "John Smith" of the test question with the Full Name label from the ontology menu. As a result of the annotation job creator user's annotation in user interface 1900, the correct test answer for test question "The John Smith Foundation" includes at the Person label and the Full Name label annotations for the span "John Smith."

Figure 12E:
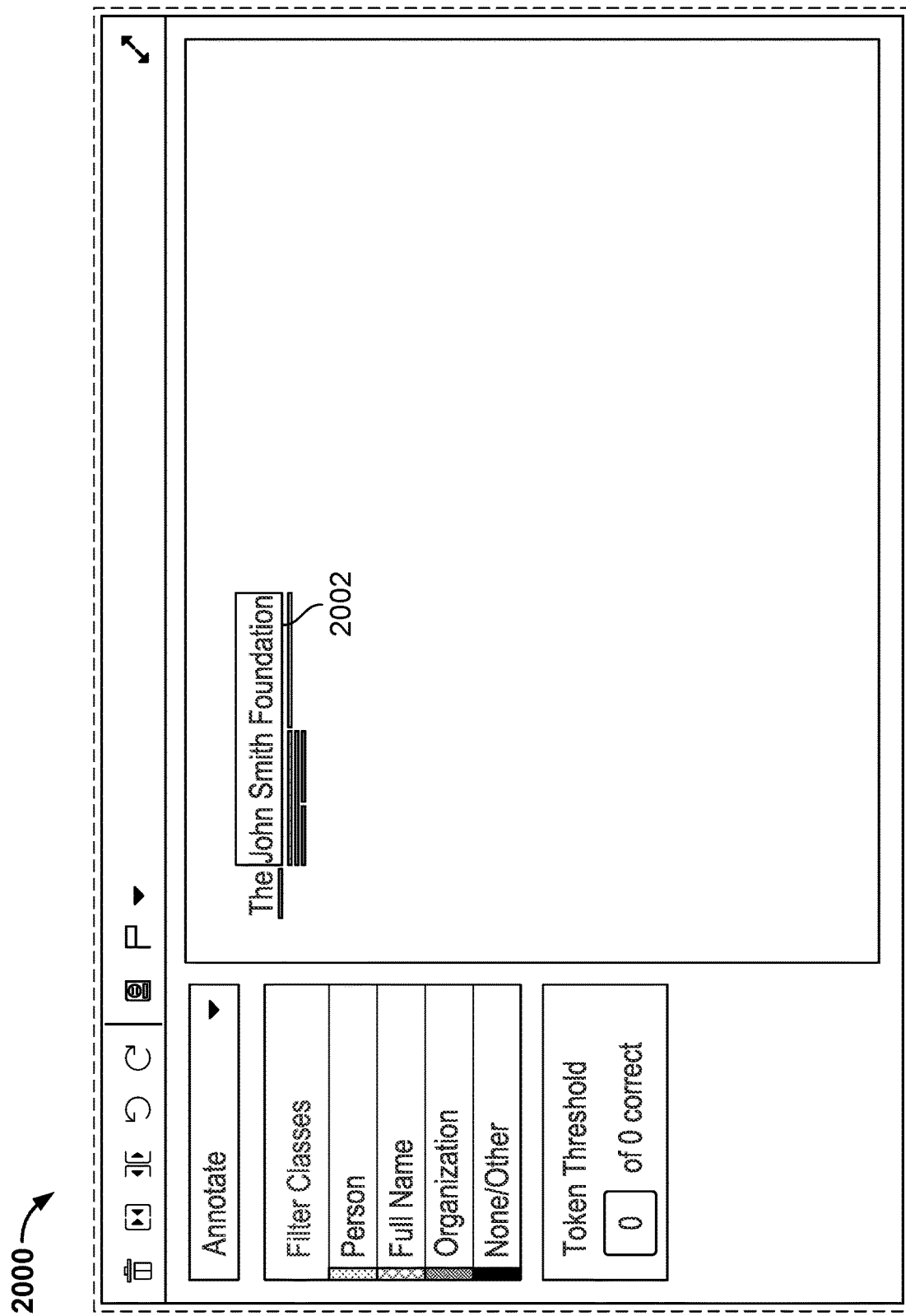
FIG. 12E is a diagram showing a fifth example user interface to be presented at an annotation job management device to enable an annotation job creator user to configure a correct test answer corresponding to a test question for an annotation job.

FIG. 12E is a diagram showing a fifth example user interface to be presented at an annotation job management device to enable an annotation job creator user to configure a correct test answer corresponding to a test question for an annotation job. For example, user interface 2000 is presented after the annotation job creator merges separately selected tokens "John," "Smith," and "Foundation" of the test question into span "John Smith Foundation" 2002 in anticipation of providing one or more labels annotation to span "John Smith Foundation" 2002 in the correct test answer.

Figure 12F:
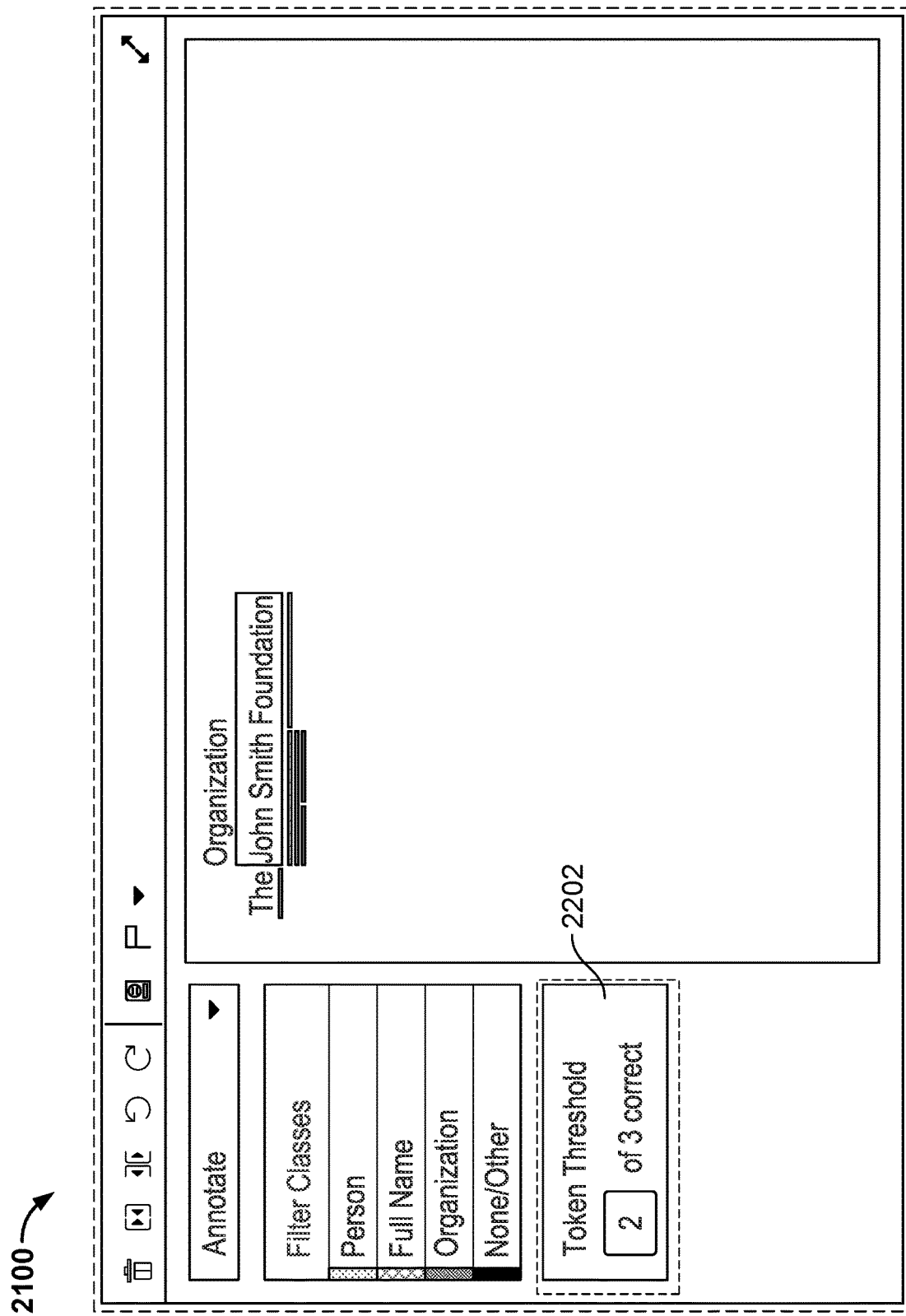
FIG. 12F is a diagram showing a sixth example user interface to be presented at an annotation job management device to enable an annotation job creator user to configure a correct test answer corresponding to a test question for an annotation job.

FIG. 12F is a diagram showing a sixth example user interface to be presented at an annotation job management device to enable an annotation job creator user to configure a correct test answer corresponding to a test question for an annotation job. For example, user interface 2100 is presented after the annotation job creator user selects to annotate selected span "John Smith Foundation" of the test question with the Organization label from the ontology menu. As a result of the annotation job creator user's annotation in user interface 2100, the correct test answer for test question "The John Smith Foundation" includes at the Person label and the Full Name label annotations for the span "John Smith" and also the Organization label annotation for the span "John Smith Organization." While not shown the example of FIGS. 12A-12F, a token or a span can be expressly configured by an annotation job creator user to not be annotated with a label (i.e., the token or span should remain unannotated) from the ontology.

Furthermore, token threshold menu 2202 enables the annotation job creator user to configure a threshold of correct annotations to tokens or spans in the test question that an annotator user has to meet in order to pass the test question. In the examples across FIGS. 12A-12F, there are three correct annotations to selected tokens or spans in test question "The John Smith Foundation" (two correct annotations to span "John Smith": Person and Full Name labels; and one correct annotation to span "John Smith Foundation": Organization label). As such, in the example of user interface 2100, the annotation job creator user has configured that at least two out of three such annotations must be made by an annotator user in an annotator answer in order to pass the test question.

Figure 13:
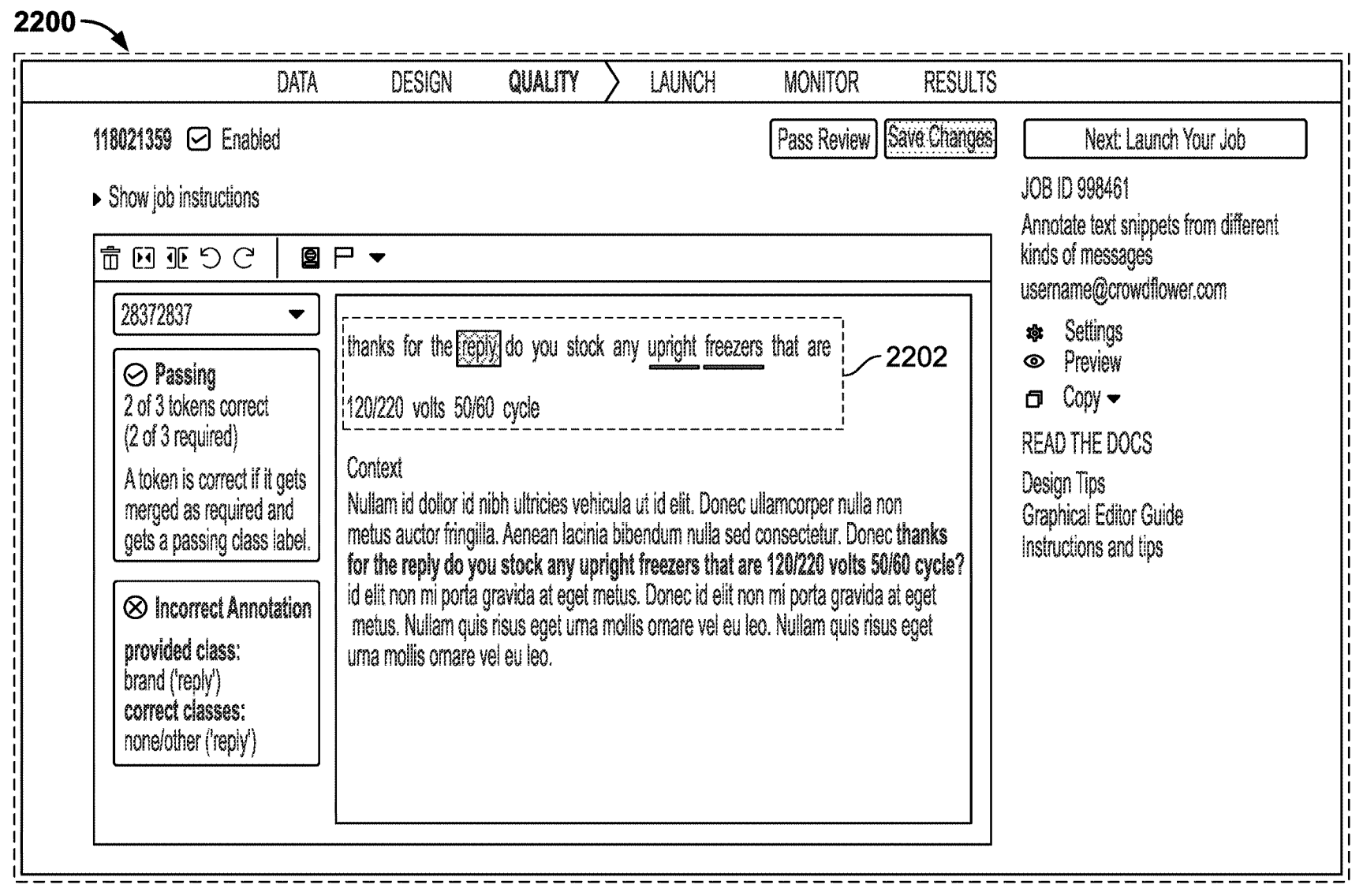

FIG. 13 is a diagram showing an example user interface to be presented at an annotation job management device for reviewing the annotation answer that was provided by an annotator user to a test question associated with an annotation job. User interface 2200 shows in area 2202 the annotation answer that comprises annotations submitted by an annotation user (via a separate user interface) to a test question that comprises the sentence "thanks for the reply do you stock any upright freezers that are 120/220 volts 50/60 cycle." The annotation answer includes a corresponding annotation to each of tokens "reply," "upright," and "freezers." For example, user interface 2200 was presented after the annotation platform server had compared the annotation answer to the correct test answer corresponding to the test question to determine how many annotations that the annotation answer had correctly made. In the example of FIG. 13, user interface 2200 presents that token "reply" was incorrectly annotated with the Brand label when it should have been left unannotated. However, user interface 2200 also implies that tokens "upright" and "freezers" were correctly annotated. Because two of three annotations were correctly made in the annotation answer and the passing threshold is at least two of three annotations, the annotation answer in FIG. 13 passes the test question. User interface 2200 provides a presentation that informs the annotation job creator user how annotator users are responding to a test question.

Figure 14:
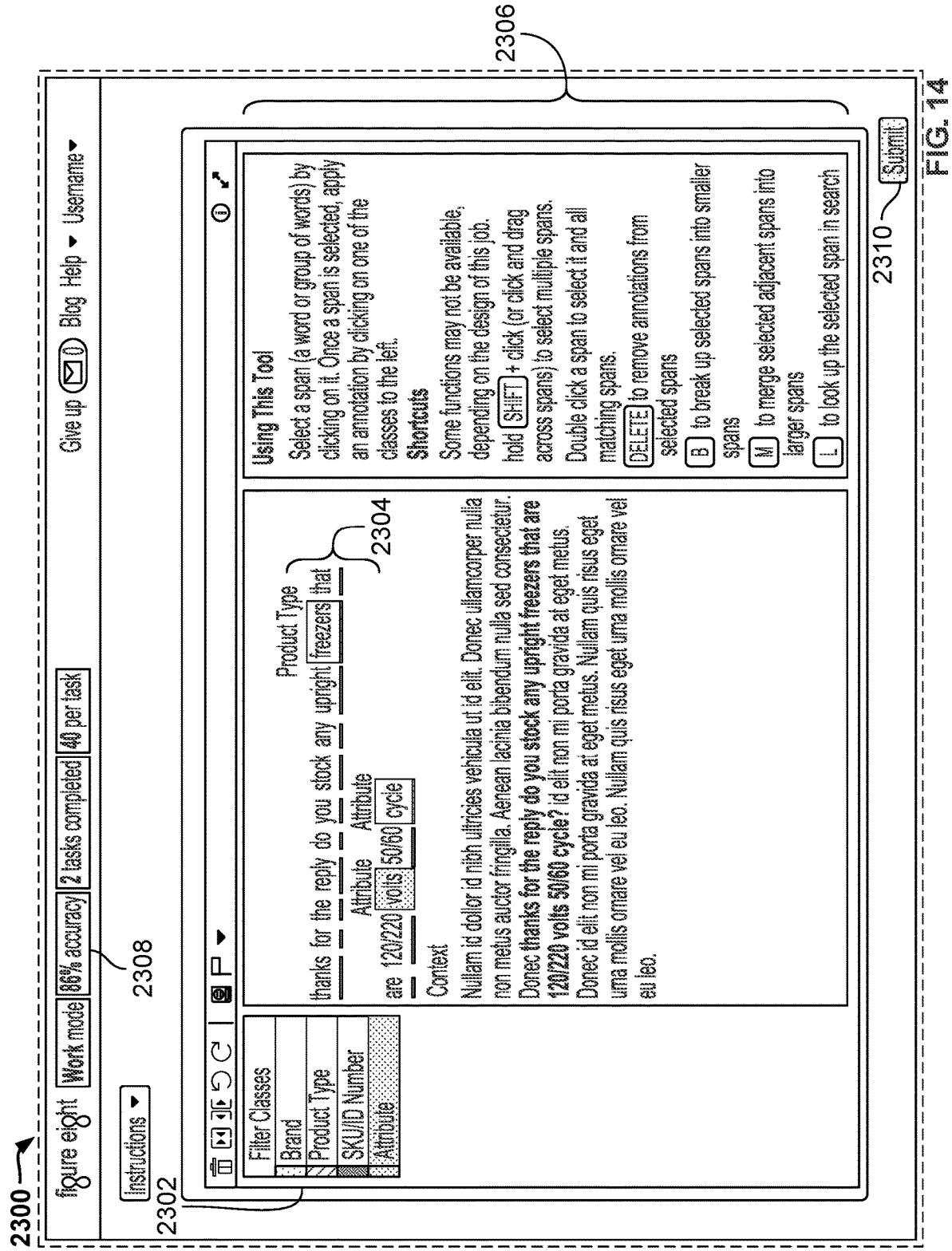
FIG. 14 is a diagram showing a first example user interface to be presented at an annotator device to enable an annotator user to perform annotation of a particular query of input text or a test question associated with an annotation job.
Figure 15:
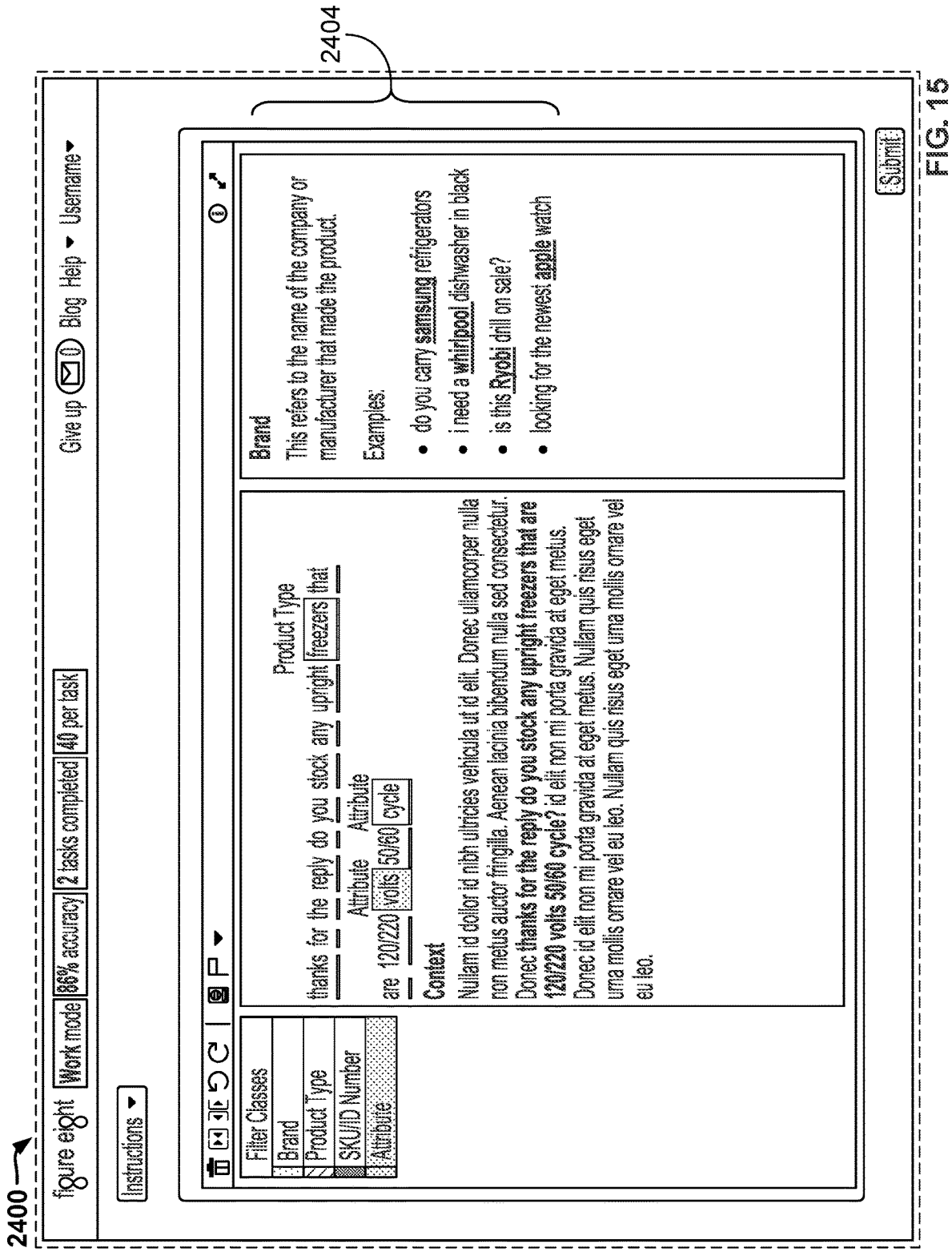
FIG. 15 is a diagram showing a second example user interface to be presented at an annotator device to enable an annotator user to perform annotation of a particular query of input text or a test question associated with an annotation job.
Figure 16:
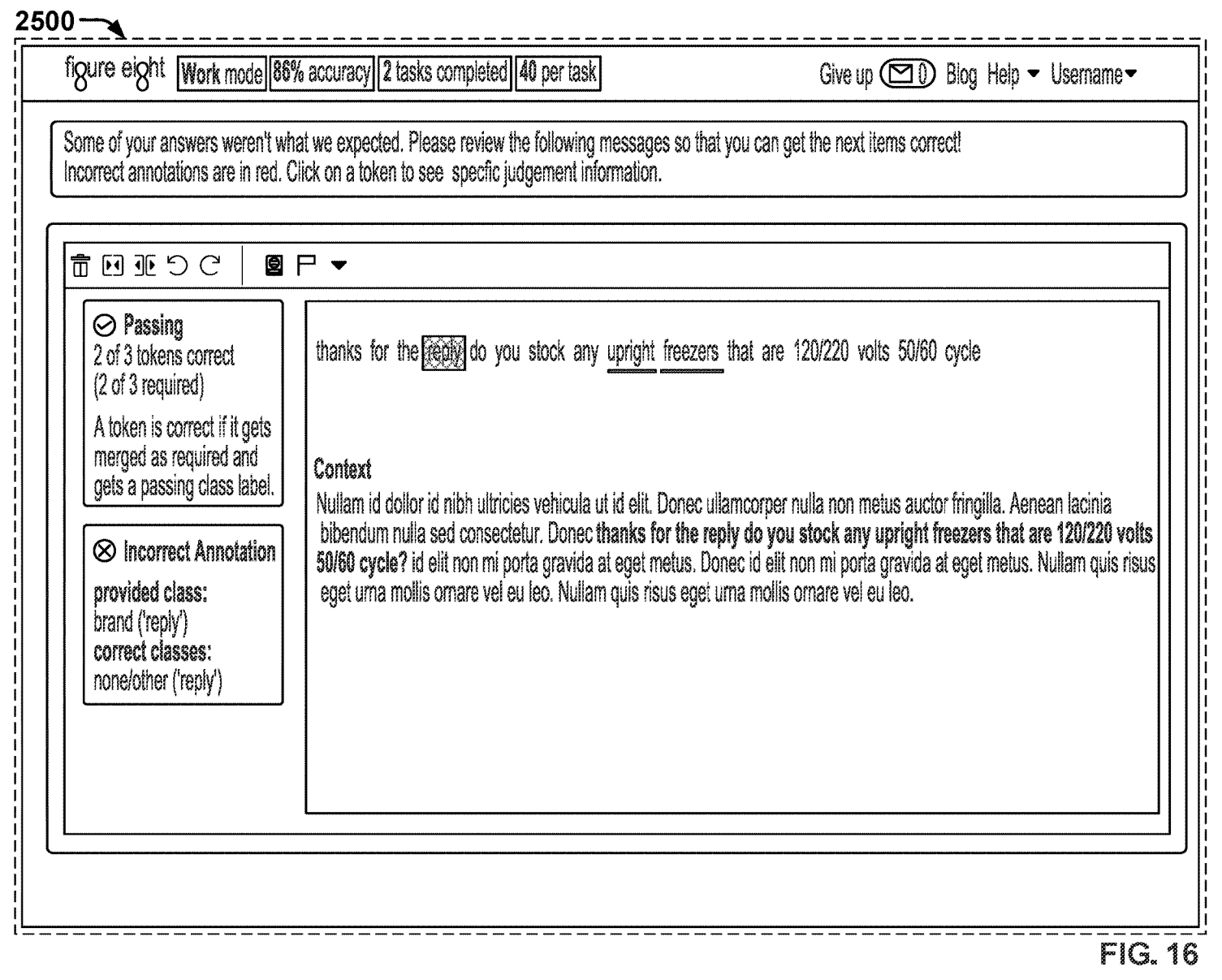

FIGS. 14, 15, and 16 below describe example user interfaces that are presented at an annotator device in connection with enabling an annotator user to perform annotation on input text associated with an annotation job.

FIG. 14 is a diagram showing a first example user interface to be presented at an annotator device to enable an annotator user to perform annotation of a particular query of input text or a test question associated with an annotation job. In the example of FIG. 14, user interface 2300 provides instructions bar 2306, which provides instructions on how the annotator user can select tokens, merge multiple tokens into spans, break up spans into individual tokens, add an annotation to a selected token or span, and/or remove an annotation from a selected token or span. Query or test question 2304 (the text could be either a query or a test question but they are presented no differently to the annotator user, in some embodiments) comprises the sentence "thanks for the reply do you stock any upright freezers that are 120/220 volts 50/60 cycle." Below query or test question 2304, contextual information is also presented. As shown in user interface 2300, the annotator user had already annotated the token "freezers" with the Product Type label from ontology menu 2302, the token "volts" with the Attribute label from ontology menu 2302, and the token "cycle" with the Attribute label from ontology menu 2302. To submit the annotations made to query or test question 2304 to the annotation platform server, the annotator user can select submit button 2310. Accuracy level 2308 of user interface 2300 shows the annotator user his or her current performance on test questions that he or she has answered for the current annotation job.

FIG. 15 is a diagram showing a second example user interface to be presented at an annotator device to enable an annotator user to perform annotation of a particular query of input text or a test question associated with an annotation job. In the example of FIG. 15, user interface 2400 includes label description bar 2404 for the label Brand of the ontology that describes how and when to annotate a token or a span with that label. Label description bar 2404 includes content that is configured with the ontology and informs the annotator user of how to annotate with the corresponding label.

FIG. 16 is a diagram showing an example user interface to be presented at an annotator device to describe how an annotator answer performed on a test question associated with an annotation job. For example, user interface 2500 may be presented for an annotator user after the annotator user had submitted an annotator answer to a test question that was previously presented to the annotator user at another user interface. User interface 2500 is dynamically generated for each annotator answer to a test question because it describes which annotation(s) the annotator answer had correctly made and which annotations were incorrectly made relative to the correct test answer. In the example of FIG. 16, user interface 2500 indicates that the submitted annotation answer had correctly annotated two of three tokens that should have been annotated according to the correct test answer. User interface 2500 also indicates which label, if any, should have been applied to the incorrectly annotated token ("reply," which should not have been annotated with any label). User interface 2500 further indicates that while the annotator user only correctly annotated two of the three correct annotations in the correct test answer, the annotator user still passed the test question because he or she only needed to submit at least two correct annotations to meet the pass threshold. After the annotator user reviews the content of user interface 2500, the annotator user can select a submit button (not shown) to acknowledge that he or she had reviewed his or her performance on the completed test question.

FIG. 17 is a diagram showing the JSON file that includes at least some information pertaining to a query that is part of input text of an annotation job. For example, file 2600 is uploaded from an annotation job management device to the annotation platform server as at least a portion of input text associated with a new annotation job. As shown in the example of FIG. 17, file 2600 includes information pertaining to a particular query. The query comprises the sentence: "it's eight one side sentence street." File 2600 includes the ID of a query ("2602712495"), a corresponding value associated with each token of the query ("it," "'s," "eight," "one," "side," "sentence," and "street"), and corresponding start and end index (e.g., position) values corresponding to each token of the query.

FIG. 18 is a diagram showing the JSON file that includes at least some information pertaining to an aggregate annotation report that had been generated for an annotation job. For example, file 2700 is generated by an annotation platform server based on annotation results that had been received from annotator devices on the input text of an annotation job. As shown in the example of FIG. 18, file 2700 includes information on aggregated labels corresponding to a particular query of the input text. The query comprises the sentence: "it's eight one side sentence street."

File 2700 describes which tokens of the query were merged into spans ("eight one," "side sentence street") and which tokens were not merged into spans ("it," "'s,"). For each token and span, file 2700 describes their aggregated label, referred to as "classname," (if applicable, a token or a span can also be left unannotated in the aggregate annotation report), the corresponding confidence level (from the range of 0 through 1) of the aggregated label ("confidence"), and whether the aggregated label was generated by a machine learning model ("machine") or one or more annotator users ("human"). The content of file 2700 can also be processed into a graphical representation, which can then be sent to and presented at an annotation job management device for an annotator job creator user.

As shown in the example of FIG. 18, an aggregate annotation report can present the aggregated annotation results from trusted annotator users (e.g., users whose accuracy levels that are determined based on their performances on test questions meet an acceptable threshold) as well as the machine predictions that had been performed on the input text to provide a query-by-query breakdown of the annotation results. The aggregate annotation report can then be used to update or create a machine learning model to programmatically annotate text in accordance with the ontology that was used in the annotation job for which the aggregate annotation report was generated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive an annotation job, including to:
obtain an input text to be annotated; and
obtain an ontology specifying a plurality of labels to be used to annotate the input text;
obtain a plurality of tokens from the input text;
distribute the annotation job to a plurality of annotator devices via an annotation platform, wherein the input text comprises a plurality of queries, and wherein to distribute the annotation job to the plurality of annotator devices involves distributing the plurality of queries to the plurality of annotator devices;
receive a plurality of annotation results with respect to the input text from the plurality of annotator devices, wherein the plurality of annotation results comprises:
a first annotated label corresponding to a token of the input text, wherein the first annotated label is selected from the ontology; and
a second annotated label corresponding to a span of the input text, wherein the span comprises two or more adjacent tokens of the input text that have been merged together by an annotator user, wherein the two or more adjacent tokens include two or more words that appear adjacent to each other in the input text, wherein the second annotated label is selected from the ontology; and
provide an aggregate annotation report corresponding to the annotation job, wherein the aggregate annotation report combines the plurality of annotation results; and one or more memories coupled to the one or more processors and configured to provide instructions to the one or more processors.

2. The system of claim 1, wherein the one or more processors are further configured to tokenize the input text.

3. The system of claim 1, wherein the one or more processors are further configured to apply machine predictions to the input text.

4. The system of claim 1, wherein the one or more processors are further configured to receive at least one test question and a corresponding at least one correct test answer associated with the annotation job.

5. The system of claim 4, wherein to distribute the annotation job to the plurality of annotator devices comprises to distribute the at least one test question to the plurality of annotator devices.

6. The system of claim 5, wherein the one or more processors are further configured to:
receive an annotator answer corresponding to the at least one test question; and
compare the annotator answer to the corresponding at least one correct test answer to determine whether the annotator answer passes the at least one test question.

7. The system of claim 6, wherein the one or more processors are further configured to:
determine that the annotator answer does not pass the at least one test question;
in response to the determination that the annotator answer does not pass the at least one test question, generate information that describes at least one annotation of the annotator answer that did not match the at least one correct test answer; and
send the information to be presented at an annotator device associated with a corresponding annotator user.

8. The system of claim 6, wherein the one or more processors are further configured to:
determine that the annotator answer does not pass the at least one test question;
in response to the determination that the annotator answer does not pass the at least one test question, update an accuracy level associated with a corresponding annotator user;
determine that the accuracy level associated with the corresponding annotator user is below a predetermined accuracy level threshold; and
in response to the determination that the accuracy level associated with the corresponding annotator user is below the predetermined accuracy level threshold, cause one or more annotation results associated with the corresponding annotator user to be excluded from the aggregate annotation report.

9. The system of claim 8, wherein the one or more processors are further configured to:
in response to the determination that the accuracy level associated with the corresponding annotator user is below the predetermined accuracy level threshold, send a query of the input text to one or more additional annotator devices to collect additional annotation results.

10. The system of claim 1, wherein to provide the aggregate annotation report corresponding to the annotation job comprises to:
determine that an aggregate label corresponding to the token of the input text is different from a machine prediction corresponding to the token, wherein the aggregate label is determined based on combining the plurality of annotation results; and include in the aggregate annotation report that a discrepancy exists between the aggregate label corresponding to the token and the machine prediction corresponding to the token.

11. The system of claim 1, wherein to provide the aggregate annotation report corresponding to the annotation job comprises to:
determine a group of annotation results corresponding to the token or the span of the input text;
determine a respective corresponding confidence level to each unique annotation result;
determine an aggregated label corresponding to the token or the span based at least in part on the respective corresponding confidence level corresponding to each unique annotation result; and
include the aggregated label corresponding to the token or the span in the aggregate annotation report.

12. A method, comprising:
receiving an annotation job, including:
obtaining an input text to be annotated; and
obtaining an ontology specifying a plurality of labels to be used to annotate the input text;
obtaining a plurality of tokens from the input text;
distributing the annotation job to a plurality of annotator devices via an annotation platform, wherein the input text comprises a plurality of queries, and wherein to distribute the annotation job to the plurality of annotator devices involves distributing the plurality of queries to the plurality of annotator devices;
receiving a plurality of annotation results with respect to the input text from the plurality of annotator devices, wherein the plurality of annotation results comprises:
a first annotated label corresponding to a token of the input text, wherein the first annotated label is selected from the ontology; and
a second annotated label corresponding to a span of the input text, wherein the span comprises two or more adjacent tokens of the input text that have been merged together by an annotator user, wherein the two or more adjacent tokens include two or more words that appear adjacent to each other in the input text wherein the second annotated label is selected from the ontology; and
providing an aggregate annotation report corresponding to the annotation job, wherein the aggregate annotation report combines the plurality of annotation results.

13. The method of claim 12, further comprising receiving at least one test question and a corresponding at least one correct test answer associated with the annotation job.

14. The method of claim 13, wherein distributing the annotation job to the plurality of annotator devices comprises distributing the at least one test question to the plurality of annotator devices.

15. The method of claim 14, further comprising:
receiving an annotator answer corresponding to the at least one test question; and
comparing the annotator answer to the corresponding at least one correct test answer to determine whether the annotator answer passes the at least one test question.

16. The method of claim 15, further comprising:
determining that the annotator answer does not pass the at least one test question;
in response to the determination that the annotator answer does not pass the at least one test question, generating information that describes at least one annotation of the annotator answer that did not match the at least one correct test answer; and
sending the information to be presented at an annotator device associated with a corresponding annotator user.

17. The method of claim 15, further comprising:
determining that the annotator answer does not pass the at least one test question;
in response to the determination that the annotator answer does not pass the at least one test question, updating an accuracy level associated with a corresponding annotator user;
determining that the accuracy level associated with the corresponding annotator user is below a predetermined accuracy level threshold; and
in response to the determination that the accuracy level associated with the corresponding annotator user is below the predetermined accuracy level threshold, causing one or more annotation results associated with the corresponding annotator user to be excluded from the aggregate annotation report.

18. A computer program product, the computer program product being embodied in a non-transitory computer readable storage medium and comprising computer instructions for:
receiving an annotation job, including:
obtaining an input text to be annotated; and
obtaining an ontology specifying a plurality of labels to be used to annotate the input text;
obtaining a plurality of tokens from the input text;
distributing the annotation job to a plurality of annotator devices via an annotation platform, wherein the input text comprises a plurality of queries, and wherein to distribute the annotation job to the plurality of annotator devices involves distributing the plurality of queries to the plurality of annotator devices;
receiving a plurality of annotation results with respect to the input text from the plurality of annotator devices, wherein the plurality of annotation results comprises:
a first annotated label corresponding to a token of the input text, wherein the first annotated label is selected from the ontology; and
a second annotated label corresponding to a span of the input text, wherein the span comprises two or more adjacent tokens of the input text that have been merged together by an annotator user, wherein the two or more adjacent tokens include two or more words that appear adjacent to each other in the input text, wherein the second annotated label is selected from the ontology; and
providing an aggregate annotation report corresponding to the annotation job, wherein the aggregate annotation report combines the plurality of annotation results.

19. The method of claim 12, further comprising tokenizing the input text.

20. The method of claim 12, further comprising applying machine predictions to the input text.

* * * * *